US011950327B2

(12) United States Patent
Bilat et al.

(10) Patent No.: US 11,950,327 B2
(45) Date of Patent: *Apr. 2, 2024

(54) HEATER MANAGEMENT BASED ON HEATER RESISTANCE

(71) Applicant: Altria Client Services LLC, Richmond, VA (US)

(72) Inventors: Stephane Bilat, Areuse (CH); Guillaume Colotte, Arnex sur Orbe (CH)

(73) Assignee: Altria Client Services LLC, Richmond, VA (US)

( * ) Notice: Subject to any disclaimer, the term of this patent is extended or adjusted under 35 U.S.C. 154(b) by 512 days.

This patent is subject to a terminal disclaimer.

(21) Appl. No.: 17/142,565

(22) Filed: Jan. 6, 2021

(65) Prior Publication Data

US 2021/0145066 A1 May 20, 2021

Related U.S. Application Data

(63) Continuation of application No. 16/732,735, filed on Jan. 2, 2020, now Pat. No. 10,905,169, which is a (Continued)

(30) Foreign Application Priority Data

Jul. 25, 2016 (EP) .................................... 16180977

(51) Int. Cl.

*A24F 13/00* (2006.01)
*A24F 40/50* (2020.01)

(Continued)

(52) U.S. Cl.

CPC ........... *H05B 1/0277* (2013.01); *A24F 40/50* (2020.01); *A24F 40/53* (2020.01); *A24F 40/57* (2020.01);

(Continued)

(58) Field of Classification Search

CPC ...................................................... A24F 47/00

(Continued)

(56) References Cited

U.S. PATENT DOCUMENTS 10,226,076 B2 3/2019 Althorpe et al.
10,299,514 B2 * 5/2019 Bilat ....................... A24F 40/53

(Continued)

FOREIGN PATENT DOCUMENTS

CN 104720119 A 6/2015
CN 205214209 U 5/2016

(Continued)

OTHER PUBLICATIONS

Filipino Office Action for corresponding Philippines Patent Application No. 1-2018-502514 dated Dec. 17, 2021.

(Continued)

*Primary Examiner* — Phuong K Dinh

(74) *Attorney, Agent, or Firm* — Harness, Dickey & Pierce, P.L.C.

(57) ABSTRACT

An electrically operated aerosol-generating system may be configured to detect adverse conditions (e.g., a dry heater). The system may comprise an electric heater comprising at least one heating element for heating an aerosol-forming substrate, a power supply, and electric circuitry connected to the electric heater and to the power supply and comprising a memory. The electric circuitry may be configured to measure an initial electrical resistance ($R_1$) of the electric heater; measure a subsequent electrical resistance of the electric heater after the measurement of the initial electrical resistance; determine the difference ($\Delta R$) between the initial electrical resistance and the subsequent electrical resistance; determine that an adverse condition is present if the difference is greater than a maximum threshold value ($\Delta R_{max}$) or less than a minimum threshold value ($\Delta R_{min}$) stored in the (Continued)

memory; and control a power to the electric heater and/or provide an indication if the adverse condition is present.

20 Claims, 7 Drawing Sheets

Related U.S. Application Data continuation of application No. 16/421,936, filed on May 24, 2019, now Pat. No. 10,555,560, which is a continuation of application No. 15/658,713, filed on Jul. 25, 2017, now Pat. No. 10,299,514, which is a continuation of application No. PCT/EP2017/066838, filed on Jul. 5, 2017.

(51) Int. Cl.

| | |
|---|---|
| ***A24F 40/53*** | (2020.01) |
| ***A24F 40/57*** | (2020.01) |
| ***H05B 1/02*** | (2006.01) |
| ***H05B 3/44*** | (2006.01) |
| *A24F 40/10* | (2020.01) |
| *A24F 40/20* | (2020.01) |

(52) U.S. Cl.
CPC ................ *H05B 3/44* (2013.01); *A24F 40/10* (2020.01); *A24F 40/20* (2020.01)

(58) Field of Classification Search
USPC .................................................. 131/328–329
See application file for complete search history.

(56) References Cited

U.S. PATENT DOCUMENTS

| | | | |
|---|---|---|---|
| 10,555,560 | B2 | 2/2020 | Bilat et al. |
| 2005/0028793 | A1 | 2/2005 | Pellizzari et al. |
| 2006/0047368 | A1 | 3/2006 | Maharajh et al. |
| 2011/0265806 | A1 | 11/2011 | Alarcon et al. |
| 2014/0014126 | A1 | 1/2014 | Peleg et al. |
| 2015/0327596 | A1 | 11/2015 | Alarcon et al. |
| 2016/0053988 | A1 | 2/2016 | Quintana |
| 2016/0057811 | A1 | 2/2016 | Alarcon et al. |
| 2016/0174611 | A1 | 6/2016 | Monsees et al. |
| 2016/0360786 | A1 | 12/2016 | Bellinger et al. |
| 2018/0140014 | A1 | 5/2018 | Yu et al. |

FOREIGN PATENT DOCUMENTS

| | | | |
|---|---|---|---|
| EP | 2468117 | A1 | 6/2012 |
| EP | 2468118 | A1 | 6/2012 |
| EP | 2609820 | A1 | 7/2013 |
| GB | 2529629 | A | 3/2016 |
| JP | H03-287117 | A | 12/1991 |
| JP | 2003-148698 | A | 5/2003 |
| JP | 2011-18494 | A | 1/2011 |
| KR | 10-2007-0108215 | A | 11/2007 |
| KR | 10-2014-0118985 | A | 10/2014 |
| RU | 2191558 | C2 | 10/2002 |
| RU | 2232032 | C2 | 7/2004 |
| WO | WO-2012/085203 | A1 | 6/2012 |
| WO | WO-2015022448 | A1 | 2/2015 |
| WO | WO-2016/030661 | A1 | 3/2016 |
| WO | WO-2016/150922 | A2 | 9/2016 |
| WO | WO-2017/021550 | A1 | 2/2017 |

OTHER PUBLICATIONS

Japanese Office Action for corresponding Japanese Patent Application No. 2019-503711 dated Nov. 29, 2021 and English translation thereof.

Substantive Examination Adverse Report for Malaysian Patent Application No. PI 2018002196 dated Oct. 20, 2021.

MY Notice of Allowance dated Jun. 28, 2022 for corresponding Malaysian Patent Application No. PI2018002196.

JP Office Action for corresponding Japanese Patent Application No. 2022-052802 dated May 9, 2023 and English translation thereof.

Extended European Search Report #16180977.7 dated Jan. 25, 2017.

International Search Report and Written Opinion for corresponding European Application No. PCT/EP2017/066838 dated Oct. 2, 2017.

International Preliminary Report on Patentability and Written Opinion dated Feb. 7, 2019, for International Application No. PCT/EP2017/066838.

Third Party Observation dated Jul. 10, 2019 for corresponding European Application No. 17734374.6.

Third Party Observations dated Oct. 22, 2019 for corresponding European Application No. 17734374.6.

Kazakhstan Notice of Allowance dated Mar. 4, 2020 for corresponding Kazakhstan Application No. 2019/0121.1.

Singaporean Written Opinion dated Jun. 16, 2020 for corresponding Singaporean Application No. 11201811639W.

European Office Action dated Jul. 16, 2020 for corresponding European Application No. 17734374.6.

Taiwanese Office Action and Search Report for corresponding Taiwanese Patent Application No. 106123488 dated Sep. 10, 2020.

PH Office Action, dated May 4, 2023, issued in corresponding Filipino Patent Application No. Jan. 2018/502514.

JP Office Action for corresponding Japanese Patent Application No. 2022-052802 dated Jan. 5, 2023 and English translation thereof.

KR Office Action for corresponding South Korean Patent Application No. 10-2019-7002068 dated Jan. 25, 2023 and English translation thereof.

Office Action for corresponding Israeli Patent Application No. 263364 dated Aug. 5, 2021 and English translation thereof.

KR Office Action for corresponding South Korean Patent Application No. 10-2019-7002068 dated Jul. 21, 2022 and English translation thereof.

JP Office Action for corresponding Japanese Patent Application No. 2019-503711 dated Aug. 1, 2022 and English translation thereof.

UA Notice of Allowance for Ukrainian Patent Application No. A201811732 dated Aug. 22, 2022 and English translation thereof.

BR Office Action for corresponding Brazilian Application No. 1120180771996 dated Sep. 27, 2021 and English translation.

JP Office Action for corresponding Japanese Application No. 2019-503711 dated May 10, 2021 and English translation thereof.

Extended European Search Report dated Mar. 15, 2022 issued in corresponding European patent application No. 21195392.2.

EP Notice of Opposition dated Jun. 16, 2022 for corresponding European Patent Application No. 17734374.6.

UA Office Action dated Jun. 22, 2022 for corresponding Ukrainian Patent Application No. A201811732 and English translation thereof.

Office Action for corresponding Russian Application No. 2019102942 dated Nov. 24, 2020 and English translation thereof.

Decision to Grant for corresponding Russian Application No. 2019102942 dated Mar. 17, 2021 and English translation thereof.

Office Action for corresponding Chinese Application No. 201780043490.5 dated Mar. 8, 2021 and English translation thereof.

EP Patent office communication consisting of an interlocutory decision in opposition proceedings dated Oct. 17, 2023 for corresponding European Patent No. 3487326.

KR Notice of Allowance for corresponding South Korean Patent Application No. 10-2019-7002068 dated Jul. 18, 2023 and English translation thereof.

EP Letter from Opponent dated Sep. 27, 2023 for corresponding European Patent No. 3487326.

Philippines Notice of Allowance dated Nov. 16, 2023 for corresponding Philippines Patent Application No. 1-2018-502514.

KR Office Action for corresponding South Korean Patent Application No. 10-2023-7035667 dated Jan. 2, 2024 and English translation thereof.

* cited by examiner

HEATER MANAGEMENT BASED ON HEATER RESISTANCE

CROSS-REFERENCE TO RELATED APPLICATIONS

This is a continuation of U.S. application Ser. No. 16/732,735, filed Jan. 2, 2020, which is a continuation of U.S. application Ser. No. 16/421,936, filed May 24, 2019, which is a continuation of U.S. application Ser. No. 15/658,713, filed Jul. 25, 2017, which is a continuation of and claims priority to PCT/EP2017/066838, filed on Jul. 5, 2017, and further claims priority to EP 16180977.7, filed on Jul. 25, 2016, each of which are hereby incorporated by reference in their entirety.

BACKGROUND

Field

Example embodiments relate to heater management.

Description of Related Art

In WO 2012/085203, the entire content of which is incorporated herein by reference, an electrically heated smoking system comprises a liquid storage portion for storing liquid aerosol-forming substrate; an electric heater comprising at least one heating element for heating the liquid aerosol-forming substrate; and electric circuitry configured to determine the depletion of liquid aerosol-forming substrate based on a relationship between a power applied to the heating element and a resulting temperature change of the heating element. In particular, the electric circuitry is configured to calculate a rate of temperature rise of the heating element, wherein a high rate of temperature rise is indicative of a drying out of a wick that conveys the liquid aerosol-forming substrate to the heater. The system compares the rate of temperature rise with a threshold value stored in memory during manufacture. If the rate of temperature rise exceeds the threshold then the system may stop supplying power to the heater.

The system of WO2012/085203 can use the electrical resistance of the heater element to calculate the temperature of the heating element, thereby not requiring a dedicated temperature sensor. However, the system still requires storage of a threshold that is dependent on the resistance of the heater element, and so is optimised for heater elements having a particular electrical resistance or range of resistance.

SUMMARY

Some examples disclosed relate to heater management in an electrically heated aerosol-generating system. Additional aspects are directed to an electrically heated aerosol-generating system and a method for operating an electrically heated aerosol-generating system. Some examples described relate to a system that can detect abnormal changes in the electrical resistance of a heater element, which may be indicative of adverse conditions at the heater element. Adverse conditions may for example be indicative of a depleted level of aerosol-forming substrate in the system. In some examples described, the system may be effective with heater elements of different electrical resistance. In other examples, detected features of the electrical resistance may be used to determine or select how the system may be operated. Some aspects and features of the examples may be applied to electrically heated smoking systems.

An electrically operated aerosol-generating system may comprise an electric heater including at least one heating element configured to heat an aerosol-forming substrate; a power supply; and electric circuitry electrically connected to the electric heater and to the power supply. The electric circuitry may include a memory. The electric circuitry may be configured to measure an initial electrical resistance of the electric heater, measure a subsequent electrical resistance of the electric heater after measuring the initial electrical resistance, determine a difference between the initial electrical resistance and the subsequent electrical resistance, determine that an adverse condition is present if the difference is greater than a maximum threshold value or less than a minimum threshold value stored in the memory, and perform at least one of controlling a power to the electric heater and providing an indication if the adverse condition is present.

The electrically operated aerosol-generating system may further comprise a device and a removable cartridge. The power supply and the electric circuitry may be in the device. The electric heater may be in the removable cartridge. The removable cartridge is configured to hold the aerosol-forming substrate.

The electrically operated aerosol-generating system may further comprise a puff detector configured to detect a puff, wherein the puff detector is electrically connected to the electric circuitry, the electric circuitry is configured to supply the power from the power supply to the at least one heating element when the puff is detected by the puff detector, and the electric circuitry is configured to determine if there is an adverse condition during the puff.

The electrically operated aerosol-generating system may further comprise a removable cartridge including the electric heater and configured to hold the aerosol-forming substrate; and a device configured to removably receive the removable cartridge. The device may include a puff detector, the power supply, and the electric circuitry. The puff detector may be configured to detect a puff. The electric circuitry may be electrically connected to the puff detector, to the power supply, and to the electric heater. The electric circuitry may include a memory and be configured to measure the initial electrical resistance of the electric heater before the puff is detected by the puff detector, supply the power from the power supply to the at least one heating element when the puff is detected by the puff detector, measure the subsequent electrical resistance of the electric heater within a time period after the supply of the power from the power supply to the electric heater is initiated, determine the difference between the subsequent electrical resistance and the initial electrical resistance, compare the difference to at least one of a maximum threshold value and a minimum threshold value stored in the memory, determine that an adverse condition is present if the difference is greater than the maximum threshold value or less than the minimum threshold value, and limit the supply of the power to the electric heater during the puff or stop the supply of the power to the electric heater for a remainder of the puff if the adverse condition is present.

The electric circuitry may be further configured to determine an existence of an electrical connection between the electric circuitry and the electric heater; and measure the initial electrical resistance of the electric heater within a time period after the electrical connection between the electric heater and the electric circuitry is determined.

The electric circuitry may be further configured to store determinations of the adverse condition in the memory;

determine a number of the determinations of the adverse condition that are consecutive; and disable the removable cartridge if the number of the determinations of the adverse condition that are consecutive is greater than the maximum threshold value.

A heater assembly may comprise an electric heater including at least one heating element; and electric circuitry electrically connected to the electric heater. The electric circuitry may include a memory. The electric circuitry may be configured to measure an initial electrical resistance of the electric heater, measure a subsequent electrical resistance of the electric heater after measuring the initial electrical resistance, determine a difference between the initial electrical resistance and the subsequent electrical resistance, determine that an adverse condition is present if the difference is greater than a maximum threshold value or less than a minimum threshold value stored in the memory, and perform at least one of controlling a power supplied to the electric heater and providing an indication if the adverse condition is present.

An electrically operated aerosol-generating device for an electrically operated aerosol-generating system may comprise a power supply; and electric circuitry electrically connected to the power supply and comprising a memory. The electric circuitry may be configured to electrically connect to an electric heater, measure an initial electrical resistance of the electric heater, measure a subsequent electrical resistance of the electric heater after measuring the initial electrical resistance, determine a difference between the initial electrical resistance and the subsequent electrical resistance, determine that an adverse condition is present if the difference is greater than a maximum threshold value or less than a minimum threshold value stored in the memory, and perform at least one of controlling a power to the electric heater and providing an indication if the adverse condition is present.

An electric circuitry (that is configured to electrically connect to an electric heater and to a power supply of an electrically operated aerosol-generating system) may comprise a memory and a microprocessor. The microprocessor may be configured to measure an initial electrical resistance of the electric heater, measure a subsequent electrical resistance of the electric heater after measuring the initial electrical resistance, determine a difference between the initial electrical resistance and the subsequent electrical resistance, determine that an adverse condition is present if the difference is greater than a maximum threshold value or less than a minimum threshold value stored in the memory, and perform at least one of controlling a power to the electric heater and providing an indication if the adverse condition is present.

The electric circuitry may be configured to further electrically connect to a puff detector. The puff detector is configured to detect a puff. The microprocessor may be further configured to determine an existence of an electrical connection between the electric circuitry and the electric heater, measure the initial electrical resistance of the electric heater within a time period after the electrical connection between the electric circuitry and the electric heater is determined, supply the power from the power supply to the electric heater when the puff is detected by the puff detector, measure the subsequent electrical resistance of the electric heater within a time period after the supply of the power from the power supply to the electric heater is initiated, determine the difference between the subsequent electrical resistance and the initial electrical resistance, compare the difference to at least one of a maximum threshold value and a minimum threshold value, determine that the adverse condition is present if the difference is greater than the maximum threshold value or less than the minimum threshold value, and limit the supply of the power to the electric heater during the puff or stop the supply of the power to the electric heater for a remainder of the puff if the adverse condition is present.

The microprocessor may be further configured to store determinations of the adverse condition in the memory, determine a number of the determinations of the adverse condition that are consecutive, and disable a removable cartridge including the electric heater if the number of the determinations of the adverse condition that are consecutive is greater than the maximum threshold value.

A method of controlling an electrically operated aerosol-generating system (that includes an electric heater and a power supply) may comprise supplying a power to the electric heater from the power supply, the electric heater including at least one heating element configured to heat an aerosol-forming substrate, measuring an initial electrical resistance of the electric heater; measuring a subsequent electrical resistance of the electric heater after the measuring of the initial electrical resistance; determining a difference between the initial electrical resistance and the subsequent electrical resistance; determining that an adverse condition is present if the difference is greater than a maximum threshold value or less than a minimum threshold value; and performing at least one of controlling the power to the electric heater and providing an indication if the adverse condition is present.

The electrically operated aerosol-generating system may further include a removable cartridge and a device configured to receive the removable cartridge. The removable cartridge may include the electric heater and be configured to hold the aerosol-forming substrate. The device may include the power supply, electric circuitry, and a puff detector configured to detect a puff. The method may further comprise measuring the initial electrical resistance of the electric heater before the puff is detected by the puff detector; supplying the power from the power supply to the at least one heating element when the puff is detected by the puff detector; measuring the subsequent electrical resistance of the electric heater within a time period after the supply of the power from the power supply to the electric heater is initiated; determining the difference between the subsequent electrical resistance and the initial electrical resistance; comparing the difference to at least one of a maximum threshold value and a minimum threshold value; determining that the adverse condition is present if the difference is greater than the maximum threshold value or less than the minimum threshold value; and limiting the power to the electric heater during the puff or stopping the power to the electric heater for a remainder of the puff if the adverse condition is present.

The method may further comprise determining an existence of an electrical connection between the electric circuitry and the electric heater; and measuring the initial electrical resistance of the electric heater within a time period after the electrical connection between the electric circuitry and the electric heater is determined.

A non-transitory computer-readable medium may comprise program code that, when executed by a microprocessor, causes the microprocessor to perform one or more of the methods disclosed herein.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1A:
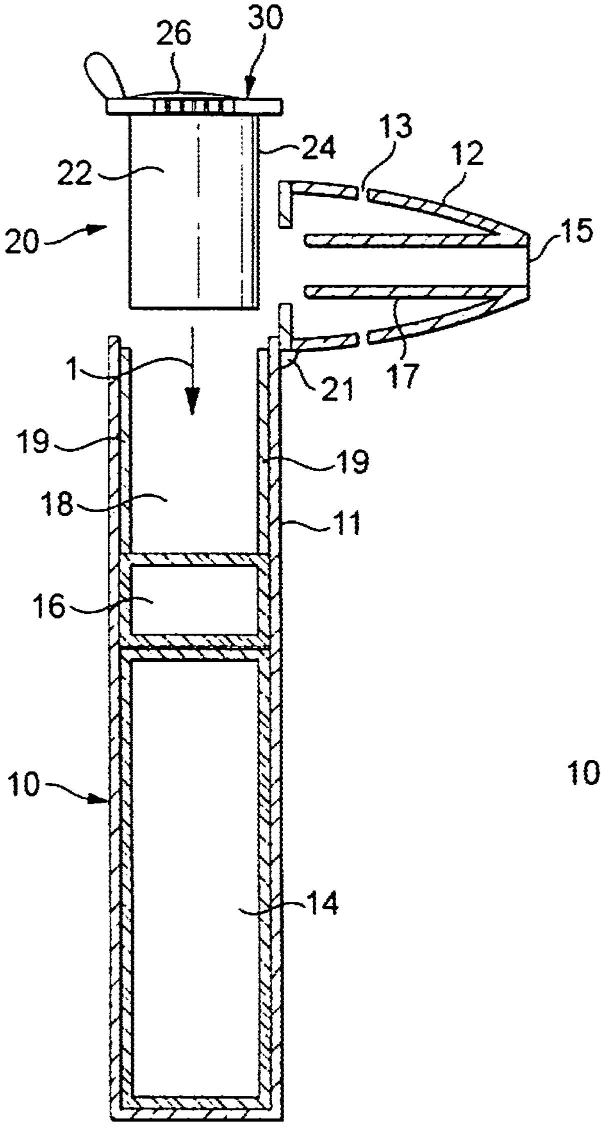
FIGS. 1*a* to 1*d* are schematic illustrations of an aerosol-generating system in accordance with an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), SoCs, field programmable gate arrays (FPGAs), computers, or the like.

One or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term “storage medium”, “computer readable storage medium” or “non-transitory computer readable storage medium,” may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term “computer-readable medium” may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In an example embodiment, there is provided an electrically operated aerosol-generating system comprising an electric heater comprising at least one heating element for heating an aerosol-forming substrate; a power supply; and electric circuitry connected to the electric heater and to the power supply and comprising a memory. The electric circuitry may be configured to measure an initial electrical resistance of the electric heater; measure a subsequent electrical resistance of the electric heater after the measurement of the initial electrical resistance; determine the difference between the initial electrical resistance and the subsequent electrical resistance; determine an adverse condition when the determined difference between the subsequent electrical resistance and the initial electrical resistance is greater than a maximum threshold value or is less than a minimum threshold value stored in the memory; and control a power supplied to the electric heater based on whether there is determined to be an adverse condition and/or provide an indication if there is determined to be an adverse condition.

One adverse condition in an aerosol-generating system or aerosol-generating device is insufficient or depleted aerosol-forming substrate at the heater. In general terms, the less aerosol-forming substrate is delivered to the heater for vaporisation, the higher the temperature of the heating element will be for a given applied power. For a given power, the evolution of the temperature of the heating element during a heating cycle, or how that evolution changes over a plurality of heating cycles, can be used to detect if there has been a depletion in the amount of aerosol-forming substrate at the heater, and in particular if there is insufficient aerosol-forming substrate at the heater.

Another adverse condition is the presence of a counterfeit or incompatible heater, or a damaged heater in a system that has a replicable or disposable heater. If the heater element resistance rises more quickly than expected for a given applied power, it might be because the heater is counterfeit and has different electrical properties to a genuine heater, or it might be because the heater is damaged in some way. In either case, the electric circuitry may be configured to prevent the supply of power to the heater.

Another adverse condition is the presence of a counterfeit, incompatible or old or damaged aerosol-forming substrate in the system. If the heater element resistance rises more quickly than expected for a given applied power, it might be because the aerosol-forming substrate is counterfeit or old and so has a higher or lower moisture content than expected. For example, if a solid aerosol-forming substrate is used, if it is very old or has been incorrectly stored, it might become dry. If the substrate is dryer than expected, less energy than expected will be used vapourising and the heater temperature will rise more quickly. This will result in an unexpected change in the electrical resistance of the heater element.

By using the difference between measurements of an initial resistance and a subsequent resistance of the electric heater, the system does not need to determine the actual temperature of the heating element or have any pre-stored knowledge of the resistance of the heating element at a given temperature. This allows different approved heaters to be used in the system and allows for variations in the absolute resistance of the same type of heater due to manufacturing tolerances, without triggering an adverse condition. It also allows for the detection of an incompatible heater.

The electric circuitry may be configured to measure an initial electrical resistance of the heater element and an electrical resistance of the heater element at a time after initial delivery of power to the electric heater from the power supply. The initial electrical resistance may be measured before first use of the heater. If the initial resistance is measured before first use of the heater then it can be assumed that the heater element is at around room temperature at the time of the measurement. As the expected change in resistance with time may depend on the initial temperature of the heater element, measuring initial resistance at or close to room temperature allows for narrower bands of expected behaviour to be set.

The initial resistance may be calculated as an initial measured resistance minus an assumed parasitic resistance resulting from other electrical components and electrical contacts within the system.

The system may comprise a device and a cartridge removably coupled to the device, wherein the power supply and the electric circuitry are in the device and the electric heater and an aerosol-forming substrate are in the removable cartridge. As used herein, the cartridge being "removably coupled" to the device means that the cartridge and device can be coupled and uncoupled from one another without significantly damaging either the device or the cartridge.

The electric circuitry may be configured to detect insertion and removal of a cartridge from the device. The electric circuitry may be configured to measure the initial electric resistance of the heater when the cartridge is first inserted into the device but before any significant heating has occurred. The electric circuitry may compare the measured initial resistance with a range of acceptable electrical resistance stored in the memory. If the initial resistance is outside the range of acceptable resistance it may be considered to be counterfeit, incompatible or damaged. In that case, the electric circuitry may be configured to prevent the supply of power until the cartridge has been removed and replaced by a different cartridge.

Cartridges having different properties may be used with the device. For example, two different cartridges having different sized heaters may be used with the device. A larger heater may be used to deliver more aerosol in accordance with personal preference.

The cartridge may be refillable, or may be configured to be disposed of when the aerosol-forming substrate is exhausted.

The aerosol-forming substrate is a substrate capable of releasing volatile compounds that can form an aerosol. The volatile compounds may be released by heating the aerosol-forming substrate.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. An aerosol-former is any suitable known compound or mixture of compounds that, in use, facilitates formation of a dense and stable aerosol and that is substantially resistant to thermal degradation at the operating temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. In an example embodiment, the aerosol-formers are polyhydric alcohols or mixtures thereof, such as triethylene glycol, 1,3-butanediol, and glycerine. The aerosol-forming substrate may comprise other additives and ingredients, such as flavourants.

The cartridge may comprise a liquid aerosol-forming substrate. For the liquid aerosol-forming substrate, certain physical properties, for example the vapour pressure or viscosity of the substrate, are chosen in a way to be suitable for use in the aerosol generating system. The liquid may comprise a tobacco-containing material comprising volatile tobacco flavour compounds which are released from the liquid upon heating. Alternatively, or in addition, the liquid may comprise a non-tobacco material. The liquid may include water, ethanol, or other solvents, plant extracts, nicotine solutions, and natural or artificial flavours. The liquid may further comprise an aerosol-former. Examples of suitable aerosol-formers are glycerine and propylene glycol.

With a liquid storage portion, the liquid therein may be protected from ambient air. In some example embodiments, ambient light cannot enter the liquid storage portion as well, so that the light-induced degradation of the liquid may be avoided. Moreover, a relatively high level of hygiene can be maintained.

In a non-limiting embodiment, the liquid storage portion is arranged to hold an amount of liquid for a desired or pre-determined number of puffs. If the liquid storage portion is not refillable and the liquid in the liquid storage portion has been used up, then the liquid storage portion has to be replaced. During such replacement, contamination with the liquid can be prevented. Alternatively, the liquid storage portion may be refillable. In that case, the aerosol generating system may be replaced after a certain number of refills of the liquid storage portion.

Alternatively, the aerosol-forming substrate may be a solid substrate. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol-former. Examples of suitable aerosol-formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol-former content of between 5% and 30% by weight on a dry weight basis. Sheets of homogenised tobacco material may be formed by agglomerating particulate tobacco obtained by grinding or otherwise comminuting one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

The electric circuitry may be configured to detect insertion and removal of an aerosol-forming substrate from the device. The electric circuitry may be configured to measure the initial electric resistance of the heater when the aerosol-forming substrate is first inserted into the device but before any significant heating has occurred. The electric circuitry may compare the measured initial resistance with a range of acceptable electrical resistance stored in the memory. If the initial resistance is outside the range of acceptable resistance the aerosol-forming substrate may be considered to be counterfeit, incompatible or damaged. In that case the electric circuitry may be configured to prevent the supply of power until the aerosol-forming substrate has been removed and replaced.

The electric heater may comprise a single heating element. Alternatively, the electric heater may comprise more than one heating element, for example two, or three, or four, or five, or six or more heating elements. The heating element or heating elements may be arranged appropriately so as to most effectively heat the liquid aerosol-forming substrate.

The at least one electric heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. In composite materials, the electrically resistive material may optionally be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise Kapton®, all-polyimide or mica foil. Kapton® is a registered trade mark of E.I. du Pont de Nemours and Company.

The at least one electric heating element may take any suitable form. For example, the at least one electric heating element may take the form of a heating blade. Alternatively, the at least one electric heating element may take the form of a casing or substrate having different electro-conductive portions, or an electrically resistive metallic tube. The liquid storage portion may incorporate a disposable heating element. Alternatively, one or more heating needles or rods that run through the liquid aerosol-forming substrate may also be suitable. Alternatively, the at least one electric heating element may comprise a flexible sheet of material. Other alternatives include a heating wire or filament, for example a Ni—Cr (Nickel-Chrome), platinum, tungsten or alloy wire, or a heating plate. Optionally, the heating element may be deposited in or on a rigid carrier material.

In one embodiment the heating element comprises a mesh, array or fabric of electrically conductive filaments. The electrically conductive filaments may define interstices between the filaments and the interstices may have a width of between 10 μm and 100 μm.

The electrically conductive filaments may form a mesh of size between 160 and 600 Mesh US (+/−10%) (e.g., between 160 and 600 filaments per inch (+/−10%)). The width of the interstices may be between 75 μm and 25 μm. The percentage of open area of the mesh, which is the ratio of the area of the interstices to the total area of the mesh, may be between 25 and 56%. The mesh may be formed using different types of weave or lattice structures. Alternatively, the electrically conductive filaments consist of an array of filaments arranged parallel to one another.

The electrically conductive filaments may have a diameter of between 10 μm and 100 μm. For instance, the diameter may be between 8 μm and 50 μm (e.g., between 8 μm and 39 μm). The filaments may have a round cross section or may have a flattened cross-section.

The area of the mesh, array, or fabric of electrically conductive filaments may be relatively small (e.g., less than or equal to 25 $mm^2$), allowing it to be incorporated in to a handheld system. The mesh, array, or fabric of electrically conductive filaments may, for example, be rectangular and have dimensions of 5 mm by 2 mm. The mesh or array of electrically conductive filaments may cover an area of between 10% and 50% of the area of the heater assembly. For instance, the mesh or array of electrically conductive filaments may cover an area of between 15 and 25% of the area of the heater assembly.

The filaments may be formed by etching a sheet material, such as a foil. This approach may be beneficial when the heater assembly comprises an array of parallel filaments. If the heating element comprises a mesh or fabric of filaments, the filaments may be individually formed and knitted together.

Suitable materials for the electrically conductive filaments include 304, 316, 304L, and 316L stainless steel.

The at least one heating element may heat the liquid aerosol-forming substrate by means of conduction. The heating element may be at least partially in contact with the substrate. Alternatively, the heat from the heating element may be conducted to the substrate by means of a heat conductive element.

When the system is in operation, the aerosol-forming substrate may be in contact with the heating element.

The electrically operated aerosol generating system may further comprise a capillary material for conveying the liquid aerosol-forming substrate from the liquid storage portion to the electric heater element.

The capillary material may be arranged to be in contact with the liquid in the liquid storage portion. The capillary wick may extend into the liquid storage portion. In that case, in use, liquid is transferred from the liquid storage portion to the electric heater by capillary action in the capillary wick. In one embodiment, the capillary wick has a first end and a second end, the first end extending into the liquid storage portion for contact with liquid therein and the electric heater being arranged to heat liquid in the second end. When the heater is activated, the liquid at the second end of the capillary wick is vaporized by the at least one heating element of the heater to form the supersaturated vapour. The supersaturated vapour is mixed with and carried in the air flow. During the flow, the vapour condenses to form the aerosol and the aerosol is carried towards the mouthpiece. The liquid aerosol-forming substrate has physical properties, including viscosity and surface tension, which allow the liquid to be transported through the capillary wick by capillary action.

The capillary wick may have a fibrous or spongy structure. The capillary wick may also comprise a bundle of capillaries. For example, the capillary wick may comprise a plurality of fibres or threads or other fine bore tubes. The fibres or threads may be generally aligned in the longitudinal direction of the aerosol generating system. Alternatively, the capillary wick may comprise sponge-like or foam-like material formed into a rod shape. The rod shape may extend along the longitudinal direction of the aerosol generating system. The structure of the wick forms a plurality of small bores or tubes, through which the liquid can be transported by capillary action. The capillary wick may comprise any suitable material or combination of materials. Examples of suitable materials are capillary materials, for example a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The capillary wick may have any suitable capillarity and porosity so as to be used with different liquid physical properties. The liquid has physical properties, including but not limited to viscosity, surface tension, density, thermal conductivity, boiling point and vapour pressure, which allow the liquid to be transported through the capillary device by capillary action.

The heating element may be in the form of a heating wire or filament encircling, and optionally supporting, the capillary wick. The capillary properties of the wick, combined with the properties of the liquid, ensure that, during normal use when there is plenty of aerosol-forming substrate, the wick is always wet in the heating area.

Alternatively, as described, the heater element may comprise a mesh formed from a plurality of electrically conductive filaments. The capillary material may extend into interstices between the filaments. The heater assembly may draw liquid aerosol-forming substrate into the interstices by capillary action.

The housing may contain two or more different capillary materials, wherein a first capillary material, in contact with the heater element, has a higher thermal decomposition temperature and a second capillary material, in contact with the first capillary material but not in contact with the heater element has a lower thermal decomposition temperature. The first capillary material effectively acts as a spacer separating the heater element from the second capillary material so that the second capillary material is not exposed to temperatures above its thermal decomposition temperature. As used herein, "thermal decomposition temperature" means the temperature at which a material begins to decompose and lose mass by generation of gaseous by products. The second capillary material may occupy a greater volume than the first capillary material and may hold more aerosol-forming substrate that the first capillary material. The second capillary material may have superior wicking performance to the first capillary material. The second capillary material may be a less expensive or have a higher filling capability than the first capillary material. The second capillary material may be polypropylene.

The power source may be any suitable power source, for example a DC voltage source. In one embodiment, the power source is a Lithium-ion battery. Alternatively, the power source may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. As an alternative, the power source may be another form of charge storage device such as a capacitor. The power source may require recharging and may have a capacity that allows for the storage of enough energy for one or more aerosol-generating experiences; for example, the power source may have sufficient capacity to allow for the continuous generation of aerosol for a period of around six minutes, corresponding to the typical time taken to smoke a cigarette, or for a period that is a multiple of six minutes. In another example, the power source may have sufficient capacity to allow for a desired or predetermined number of puffs or discrete activations of the heater.

The aerosol generating system comprises a housing. The housing may have an elongated form. The housing may comprise any suitable material or combination of materials. Examples of suitable materials include metals, alloys, plastics, or composite materials containing one or more of those materials, or thermoplastics that are suitable for food or pharmaceutical applications (e.g., polypropylene, polyetheretherketone (PEEK) and polyethylene). The material may be light and non-brittle.

The electrically heated aerosol-generating system may be portable. The electrically heated aerosol-generating system may have a size comparable to a cigar or cigarette. The electrically heated aerosol-generating system may have a total length between approximately 30 mm and approximately 150 mm. The electrically heated aerosol-generating system may have an external diameter between approximately 5 mm and approximately 30 mm.

The electric circuitry may comprise a microprocessor (e.g., a programmable microprocessor). The system may comprise a data input port or a wireless receiver to allow software to be uploaded onto the microprocessor. The electric circuitry may comprise additional electrical components. The system may comprise a temperature sensor.

If an adverse condition is detected, the system may do no more than provide an indication that an adverse condition has been detected. This may be done by providing a visual, audible, or haptic warning. Alternatively, or in addition, the electric circuitry may automatically limit or otherwise control the power supplied to the heater when an adverse condition is detected.

There are many possibly ways in which the electric circuitry can be configured control the power supplied to the electric heater if an adverse condition is detected. If insufficient aerosol-forming substrate is being delivered to the heating element, or a solid aerosol-forming substrate is becoming dry, then it may be desirable to reduce or stop the supply of power to the heater. This may be both to ensure a consistent and enjoyable experience and to mitigate the possibilities of overheating and the generation of undesirable compounds in the aerosol. The supply of power to the heater may be stopped or limited. The supply of power may be stopped or limited for a short time. However, the supply of power may be stopped or limited until the heater or aerosol-forming substrate is replaced.

For example, pulses of 6 W may be initially supplied to the heater during a puff. When an adverse condition is determined during a puff, the power supply may be limited to pulses of 5 W for the remainder of the puff. In some example embodiments, the electric circuitry may be configured to supply non-limited 6 W pulses to the heater in subsequent puffs, until further adverse conditions are determined. However, in other example embodiments, the electric circuitry may be configured to supply limited 5 W pulses to the heater in subsequent puffs, until the heater or aerosol-forming substrate is replaced.

The system may comprise a puff detector for detecting when puffing or a negative pressure is being applied to the system, wherein the puff detector is connected to the electric circuitry and wherein the electric circuitry is configured to supply power from the power supply to the heater element when a puff is detected by the puff detector, and wherein the electric circuitry is configured to determine if there is an adverse condition during each puff.

The puff detector may be a dedicated puff detector that directly measures air flow through the device, such as a microphone based puff detector, or may detect puffs indirectly, for example, based on changes in temperature with in the device or changes in electrical resistance of the heater element.

The electric circuitry may be configured to supply a desired or predetermined level of power to the heater element for a time period $\Delta t_1$ following an initial detection of a puff or initial supply of power to the heater, and the electric circuitry may be configured to determine the change in electrical resistance of the heater element based on a measure of the electrical resistance of the heater element at time $t_1$ during each puff. Time period $\Delta t_1$ may be chosen to be soon after the initial detection of a puff or soon after first application of power to the heater. This is beneficial during first use following replacement of a consumable cartridge if the circuitry is detecting an incompatible or counterfeit heater or aerosol-forming substrate. For example, a typical puff may have a duration of 3 s and the response time of the puff detector may be about 100 ms. Then $\Delta t_1$ may be chosen to be between 100 ms and 500 ms, during the period of the puff before the temperature of the heater stabilises. Alternatively, time period $\Delta t_1$ may be chosen to be when the temperature of the heating element is expected to have stabilised.

The electric circuitry may be configured to prevent the supply of power to the heater element from the power supply if an adverse condition is determined for a desired or predetermined number of sequential or consecutive puffs. The desired or predetermined number of sequential or consecutive puffs may be any suitable number. For example, the desired or predetermined number of sequential or consecutive puffs may be 1, 2, 3, 4, 5 or 6. In a non-limiting embodiment, the desired or predetermined number of sequential or consecutive puffs is 3.

The electric circuitry may be configured to continually determine if there is an adverse condition, and to limit or prevent the supply of power to the heater when there is an adverse condition and continue to prevent or reduce the supply of power to the heater element until there is no longer an adverse condition.

In a liquid and wick based system, excessive puffing may result in drying of the wick as liquid cannot be replaced quickly enough near the heater. In these circumstances it is desirable to limit the supply of power to the heater so that the heater does not get too hot and produce undesirable aerosol constituents. As soon as an adverse condition is detected, then the power to the heater may be stopped until a subsequent puff.

Similarly, excessive puffing may not allow the heater to cool as expected between puffs, resulting in a gradual, undesirable rise in the temperature of the heater from puff to puff. This is true of liquid or solid aerosol-forming substrate based systems. To slow the undesirable rise in the temperature of the heater from puff to puff, when an adverse condition is determined, the electric circuitry may be configured to prevent or limit the supply of power for the remainder of the puff and to continue to limit the supply of power to the heater element for subsequent puffs until there is no longer an adverse condition. The electric circuitry may further be configured to disable the heater element or permanently or irreversibly prevent or inhibit the supply of power to the heater element from the power supply, if an adverse condition is determined for a desired or predetermined number of sequential or consecutive puffs. As used herein, ‘disable’ refers to rendering the heater element inoperable. For example, the electric circuitry may be configured to blow a fuse connected to the heater element if an adverse condition is determined for three consecutive puffs.

The electric circuitry may be configured to prevent the supply of power to the heater element for a desired or predetermined stop time period when there is an adverse condition.

The electric circuitry may be configured to prevent the supply of power to the heater until a consumable portion containing the aerosol-forming substrate or the heater is replaced.

Alternatively, or in addition, the electric circuitry may be configured to continually calculate whether difference between the initial resistance and the subsequent resistance has reached the maximum threshold value or the minimum threshold value, and to compare the time taken for the difference to reach the threshold value with a stored time value, and if the time taken for the threshold value to be reached is less than the stored time value, or if the difference does not reach the threshold value in an expected time period, determining that there is an adverse condition and to prevent or reduce the supply of power to the heater. If the threshold value is reached more quickly than expected then it may be indicative of a dry heater element or dry substrate or may be indicative of an incompatible, counterfeit or damaged heater. Similarly if the threshold value is not reached within an expected time period then it may be indicative of a counterfeit or damaged heater or substrate. This may allow for a fast determination of counterfeit, damaged or incompatible heater or substrate.

As well as being indicative of dry conditions at the heater element, a finding of an adverse condition may be indicative of a heater that has electrical properties outside of the range of expected properties. This may be because the heater is faulty, because of a build-up of material on the heater over its lifetime, or because it is an unauthorised or counterfeit heater. For example, if a manufacturer used stainless steel heater elements, those heater elements may be expected to have an initial electrical resistance at room temperature within a particular range of electrical resistance. Furthermore, the difference between an initial electrical resistance of the heater and a subsequent resistance of the heater may be expected to have a particular value as it is related to the material of the heater element. The electric circuitry may be configured to determine an adverse condition when a difference between an initial electrical resistance of the heater and a subsequent electrical resistance of the heater is outside of a range of expected values, and to limit or prevent the supply of power to the heater based on the result. This may prevent the use of some unauthorised heaters.

Multiple different thresholds may be used to give rise to different control strategies for different conditions. For example, a highest threshold and a lowest threshold may be used to set the bounds for requiring replacement of the heater of the substrate before further power is supplied. The electric circuitry may be configured, if the difference exceeds the highest threshold or is less than the lowest threshold, to prevent the supply of power to the heater until the heater or the aerosol-forming substrate is replaced. One or more intermediate thresholds may be used to detect excessive puffing behaviour that result in dry conditions at the heater. The electric circuitry may be configured, if the intermediate threshold is exceeded, but the highest threshold is not exceeded, to prevent the supply of power to the heater for a particular period of time or until a subsequent puff. One or more intermediate thresholds could also be used to trigger an indication that the aerosol-forming substrate is almost depleted and will need replacing soon. The electric circuitry may be configured, if the intermediate threshold is exceeded, but the highest threshold is not exceeded, to provide an indication, which may be visible, audible or haptic.

One process for detecting a counterfeit, damaged or incompatible heater is to check the resistance of the heater, or the rate of change of the resistance of the heater, when the heater is first used or inserted into the device or system. The electric circuitry may be configured to measure an initial resistance of the heater element within a desired or predetermined time period after power is supplied to the heater. The desired or predetermined time period may be a relatively short time period and may be between 50 ms and 200 ms. For a heater comprising a mesh heating element, the desired or predetermined time period may be around 100 ms. In a non-limiting embodiment, the desired or predetermined time period is between 50 ms and 150 ms. The electric circuitry may be configured to measure an initial resistance of the heater as a separate routine to supplying power to the heater to heat an aerosol-forming substrate, using much lower power, or may measure the initial resistance of the heater during the first few moments that the heater is activated, before significant heating has occurred. The electric circuitry may be configured to compare the initial resistance of the heater with a range of acceptable values, and if the initial resistance is outside the range of acceptable values, the electric circuitry may be configured to prevent the supply of power to the electric heater, and/or provide an indication, until the heater or the aerosol-forming substrate is replaced.

If the initial resistance is within the range of acceptable values, then the electric circuitry may be configured to determine that there is an acceptable heater and to control a power supplied to the electric heater based on whether there is an acceptable heater, or to provide an indication, if there is not an acceptable heater.

The electric circuitry may be configured to determine that there is an acceptable heater within one second of power first being supplied to the heater.

In a second aspect there is provided a heater assembly for use in an electrically operated aerosol-generating system, such as the electrically operated aerosol-generating system of the first aspect, or an electrically operated aerosol-generating device. The heater assembly may comprise an electric heater comprising at least one heating element; and electric circuitry connected to the electric heater and comprising a memory. The electric circuitry may be configured to measure an initial electrical resistance of the electric heater; measure a subsequent electrical resistance of the electric heater after the measurement of the initial electrical resistance; determine the difference between the initial electrical resistance and the subsequent electrical resistance; determine when the determined difference between the subsequent electrical resistance and the initial electrical resistance of the electric heater is greater than a maximum threshold value or is less than a minimum threshold value stored in the memory; and control a power supplied to the electric heater based on whether there is determined to be an adverse condition and/or to provide an indication if there is an adverse condition.

The heater assembly may be configured for use in an aerosol-generating system and may be configured to heat an aerosol-forming substrate in use.

In a third aspect, there is provided an electrically operated aerosol-generating device for use in an electrically operated aerosol-generating system, such as the electrically operated aerosol-generating system of the first aspect. The electrically operated aerosol-generating device may comprise a power supply; and electric circuitry connected to the power supply and comprising a memory. The electric circuitry may be configured to electrically connect to an electric heater of the electrically operated aerosol-generating system; measure an initial electrical resistance of the electric heater; measure a subsequent electrical resistance of the electric heater after the measurement of the initial electrical resistance; determine the difference between the initial electrical resistance and the subsequent electrical resistance; determine that there is an adverse condition when the determined difference between the subsequent electrical resistance and the initial electrical resistance is greater than a maximum threshold value or is less than a minimum threshold value stored in the memory; and control a power supplied to the electric heater based on whether there is determined to be an adverse condition and/or provide an indication if there is determined to be an adverse condition.

In another example embodiment, there is provided electric circuitry for an electrically operated aerosol-generating system, such as the electrically operated aerosol-generating system of the first aspect, or an electrically operated aerosol-generating device, such as the electrically operated aerosol-generating device of the third aspect. The electric circuitry may be connected to an electric heater and to a power supply. The electric circuitry may comprise a memory and a microprocessor configured to measure an initial electrical resistance of the electric heater and measure a subsequent electrical resistance of the electric heater after the measurement of the initial electrical resistance; determine the difference between the initial electrical resistance and the subsequent electrical resistance; determine an adverse condition when the determined difference between the subsequent electrical resistance and the initial electrical resistance is greater than a maximum threshold value or is less than a minimum threshold value stored in the memory; and control a power supplied to the electric heater based on whether there is determined to be an adverse condition and/or provide an indication if there is determined to be an adverse condition.

In use, the electric circuitry may be further connected to a puff detector for detecting when puffing is occurring and the electric circuitry may be further configured to determine when the electric circuitry is connected to the electric heater;

measure the initial resistance of the electric heater within a desired or predetermined time period after connection of the electric circuitry to the electric heater; supply power from the power supply to the heating element when a puff is detected by the puff detector; measure the subsequent resistance of the electric heater within a desired or predetermined time period after the supply of power from the power supply to the electric heater is initiated; determine the difference between the subsequent resistance and the initial resistance; compare the difference between the subsequent resistance and the initial resistance to at least one of a maximum threshold value and a minimum threshold value stored in the memory; determine that there is an adverse condition if the difference is greater than the maximum threshold value or is less than the minimum threshold value; and limit the power supplied to the electric heater during the puff if there is determined to be an adverse condition or prevent power from being supplied to the electric heater for the remainder of the puff based on whether there is determined to be an adverse condition.

In some example embodiments, the electric circuitry may be further configured to store the determination of an adverse condition in the memory; determine the number of consecutive determinations of adverse conditions based on the stored determinations of adverse conditions; and disable the cartridge if the determined number of consecutive determinations of adverse conditions is greater than a maximum threshold value.

The electric circuitry may be configured to disable the cartridge by any suitable means. For example, the electric circuitry may be configured to blow a fuse connected to the electric heater.

In a fifth aspect, there is provided a method of controlling the supply of power to an electric heater of an electrically operated aerosol-generating system, such as the electrically operated aerosol-generating system of the first aspect, or an electrically operated aerosol-generating device, such as the electrically operated aerosol-generating device of the third aspect, the system or device comprising an electric heater comprising at least one heating element for heating an aerosol-forming substrate, and a power supply for supplying power to the electric heater, the method comprising supplying power to the electric heater; measuring an initial electrical resistance of the electric heater; measuring a subsequent electrical resistance of the electric heater after the measurement of the initial electrical resistance; determining the difference between the initial electrical resistance and the subsequent electrical resistance; determining an adverse condition when the determined difference between the subsequent electrical resistance and the initial electrical resistance is greater than a maximum threshold value or is less than a minimum threshold value; and controlling the power supplied to the electric heater based on whether there is determined to be an adverse condition and/or provide an indication if there is determined to be an adverse condition.

The method may comprise measuring the initial electrical resistance of the heater element and measuring the electrical resistance of the heater element at a time after initial delivery of power to the electric heater from the power supply.

The method may comprise supplying a constant power to the heater when power is being supplied. Alternatively, variable power may be supplied dependent on other operating parameters. In that case the threshold value may be dependent on the power supplied to the heater.

The method may comprise determining the initial electrical resistance before first use of the heater. If the initial resistance is determined before first use of the heater then it can be assumed that the heater element is at around room temperature. As the expected change in resistance with time may depend on the initial temperature of the heater element, measuring initial resistance at or close to room temperature allows for narrower bands of expected behaviour to be set.

The method may comprise calculating the initial resistance as an initial measured resistance minus an assumed parasitic resistance resulting from other electrical components and electrical contacts within the system.

The electrically operated aerosol-generating system may comprise a puff detector for detecting when puffing is occurring, and the method may comprise supplying power from the power supply to the heater element when a puff is detected by the puff detector, determining if there is an adverse condition during each puff, and preventing the supply of power to the heater element from the power supply if there is an adverse condition for a desired or predetermined number of sequential puffs.

The method may comprise preventing the supply of power to the heater element from the power supply if there is adverse condition.

The method may comprise continually determining if there is an adverse condition, and preventing the supply of power to the heater when there is an adverse condition and continuing to prevent the supply of power to the heater element until there is no longer an adverse condition.

The method may comprise preventing the supply of power to the heater element for a desired or predetermined stop time period when there is an adverse condition.

Alternatively, or in addition, the method may comprise continually calculating whether the difference has exceeded the maximum threshold value or the minimum threshold value, and comparing the time taken for the threshold value to be reached with a stored time value, and if the time taken for threshold to be reached is less than the stored time value, determining and adverse condition and controlling the supply of power to the heater.

In some example embodiments, the electrically operated aerosol-generating system may further comprise a removable cartridge and a device configured to removably receive the removable cartridge, the removable cartridge comprising the electric heater and a liquid aerosol-forming substrate and the device comprising the power supply and the electric circuitry, the electric circuitry being connected to the puff detector for detecting when puffing or a negative pressure is being applied to the system. In such example embodiments, the method may further comprise measuring an initial resistance of the electric heater before a puff is detected by the puff detector; suppling power from the power supply to the heating element when a puff is detected by the puff detector; measuring a subsequent resistance of the electric heater within a desired or predetermined time period after the supply of power from the power supply to the electric heater is initiated; determining the difference between the subsequent resistance and the initial resistance; comparing the difference between the subsequent resistance and the initial resistance to at least one of a maximum threshold value and a minimum threshold value stored in the memory; determining that there is an adverse condition if the difference is greater than the maximum threshold value or is less than the minimum threshold value; and limiting the power supplied to the electric heater during the puff if there is determined to be an adverse condition or preventing power from being supplied to the electric heater for the remainder of the puff if there is determined to be an adverse condition.

In some example embodiments, the method further comprises determining when the electric circuitry is connected to the electric heater; and measuring the initial resistance of the electric heater within a desired or predetermined time period after connection to the electric heater.

In another example embodiment, there is provided a method of detecting an incompatible or damaged heater of an electrically operated aerosol-generating system, such as the electrically operated aerosol-generating system of the first aspect, or an electrically operated aerosol-generating device, such as the electrically operated aerosol-generating device of the third aspect, the system or device comprising an electric heater comprising at least one heating element for heating an aerosol-forming substrate, and a power supply for supplying power to the electric heater. The method may comprise supplying power to the electric heater; measuring an initial electrical resistance of the electric heater; measuring a subsequent electrical resistance of the electric heater after the measurement of the initial electrical resistance; determining the difference between the initial electrical resistance and the subsequent electrical resistance; determining an incompatible or damaged heater when the determined difference between the subsequent electrical resistance and the initial electrical resistance is greater than a maximum threshold value or is less than a minimum threshold value, or when the difference reaches a threshold value stored in the memory outside of an expected time period.

The method may comprise, if there is determined to be an incompatible heater, preventing the supply of power to the electric heater, and/or providing an indication, until the heater or the aerosol-forming substrate is replaced.

The method may further comprise measuring an initial resistance of the heater or an initial rate of change of resistance of the heater, within a desired or predetermined time period after power is supplied to the heater, comparing the initial resistance of the heater or an initial rate of change of resistance of the heater, with a range of acceptable values, and if the initial resistance or initial rate of change of resistance is outside the range of acceptable values, preventing the supply of power to the electric heater, and/or providing an indication, until the heater or the aerosol-forming substrate is replaced.

The desired or predetermined time period may be a relatively short time period and may be between 50 ms and 200 ms. For a heater comprising a mesh heating element, the desired or predetermined time period may be around 100 ms. In a non-limiting embodiment, the desired or predetermined time period is between 50 ms and 150 ms.

Determining an initial rate of change of resistance during the desired or predetermined time period may be achieved by taking a plurality of resistance measurements at different times during the desired or predetermined time period and calculating a rate of change of resistance based on the plurality of resistance measurements.

The method may further comprise detecting when a heater or aerosol-forming substrate is inserted into the system. The method may be performed immediately after a heater or aerosol-forming substrate is detected to have been inserted into the system.

In another example embodiment, there is provided a computer program product directly loadable into the internal memory of a microprocessor comprising software code portions for performing the steps of the fifth or sixth aspect when said product is run on a microprocessor in an electrically operated aerosol-generating system, the system comprising an electric heater comprising at least one heating element for heating an aerosol-forming substrate, and a power supply for supplying power to the electric heater, the microprocessor being connected to the electric heater and to the power supply.

The computer program product may be provided as a downloadable piece of software or recorded on a computer readable storage medium.

According to another example embodiment, there is provided a computer readable storage medium having stored thereon a computer program.

Features described in relation one aspect of the examples may be applied to other aspects of the examples. In particular, features described in relation to the first aspect may be applicable to the second, third and fourth aspects of the examples. The features described in relation to the first, second, third and fourth aspects of the examples may also be applicable to the fifth, sixth, and seventh aspects of the examples.

FIGS. 1*a* to 1*d* are schematic illustrations of an electrically heated aerosol-generating system, including a cartridge in accordance with an example embodiment. FIG. 1*a* is a schematic view of an aerosol-generating device 10 and a separate cartridge 20, which together form the electrically heated aerosol-generating system.

The cartridge 20 contains an aerosol-forming substrate and is configured to be received in a cavity 18 within the device. Cartridge 20 can be replaced when the aerosol-forming substrate provided in the cartridge is depleted. FIG. 1*a* shows the cartridge 20 just prior to insertion into the device, with the arrow 1 in FIG. 1*a* indicating the direction of insertion of the cartridge.

The aerosol-generating device 10 is portable and has a size comparable to a cigar or cigarette. The aerosol-generating device 10 comprises a main body 11 and a mouthpiece portion 12. The main body 11 contains a battery 14, such as a lithium iron phosphate battery, electric circuitry or control electronics 16 and a cavity 18. The electric circuitry or control electronics 16 comprises a programmable microprocessor. The mouthpiece portion 12 is connected to the main body 11 by a hinged connection 21 and can move between an open position as shown in FIG. 1 and a closed position as shown in FIG. 1*d*. The mouthpiece portion 12 is placed in the open position to allow for insertion and removal of cartridges 20 and is placed in the closed position when the system is to be used to generate aerosol. The mouthpiece portion comprises a plurality of air inlets 13 and an outlet 15. In use, a negative pressure or puff is applied to the outlet to draw air from the air inlets 13, through the mouthpiece portion 12, and to the outlet 15. Internal baffles 17 are provided to force the air flowing through the mouthpiece portion 12 past the cartridge.

The cavity 18 has a circular cross-section and is sized to receive a housing 24 of the cartridge 20. Electrical connectors 19 are provided at the sides of the cavity 18 to provide an electrical connection between the control electronics 16 and battery 14 and corresponding electrical contacts on the cartridge 20.

Figure 1B:
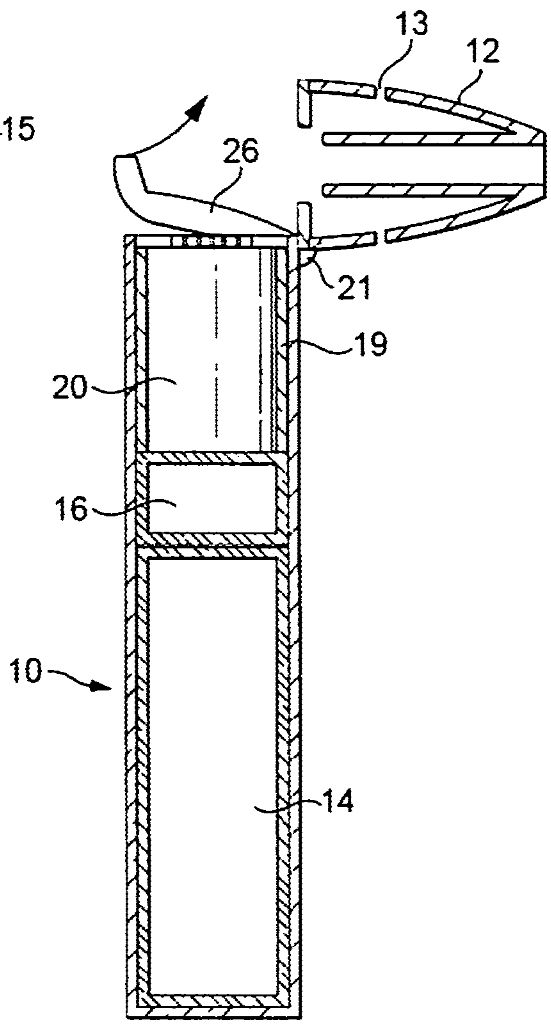

FIG. 1*b* shows the system of FIG. 1*a* with the cartridge inserted into the cavity 18, and the cover 26 being removed. In this position, the electrical connectors rest against the electrical contacts on the cartridge.

Figure 1C:
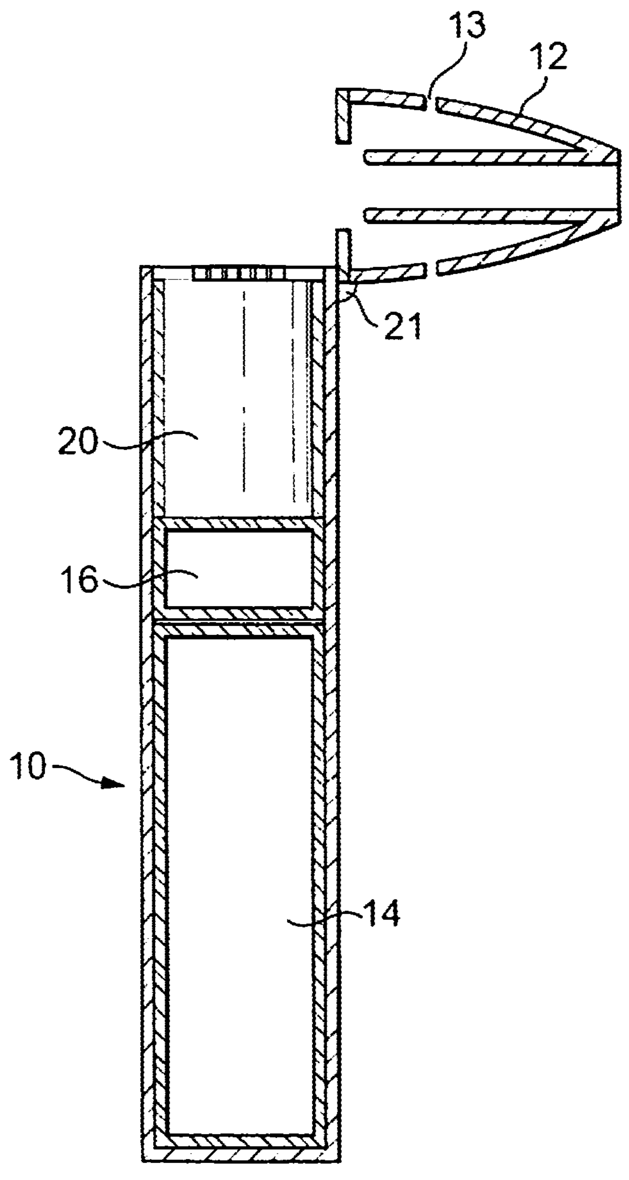
Figure 1D:
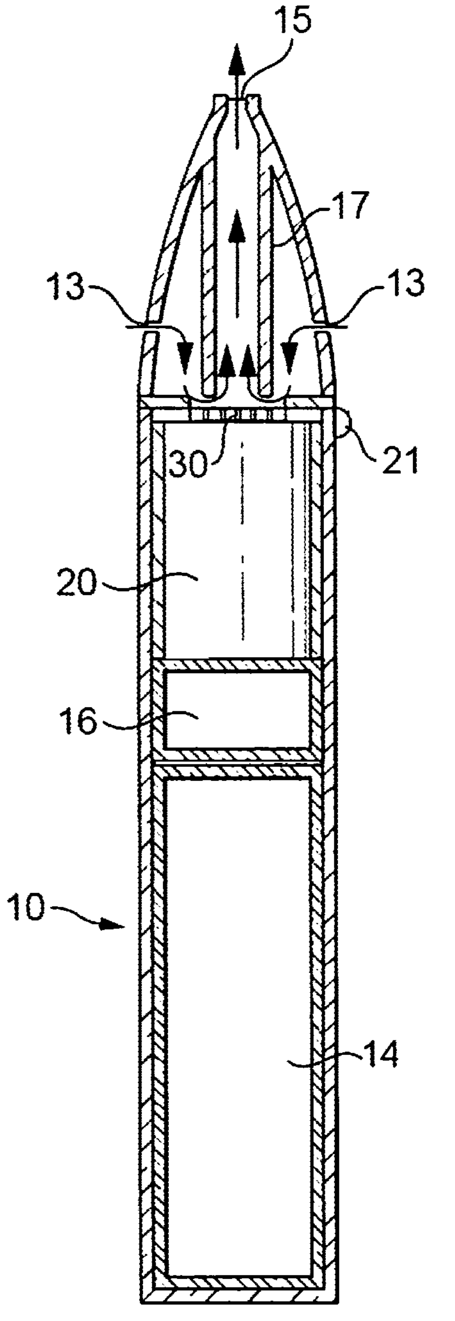

FIG. 1*c* shows the system of FIG. 1*b* with the cover 26 fully removed and the mouthpiece portion 12 being moved to a closed position.

FIG. 1*d* shows the system of FIG. 1*c* with the mouthpiece portion 12 in the closed position. The mouthpiece portion 12 is retained in the closed position by a clasp mechanism. The mouthpiece portion 12 in a closed position retains the cartridge in electrical contact with the electrical connectors 19 so that a good electrical connection is maintained in use, whatever the orientation of the system is.

Figure 2:
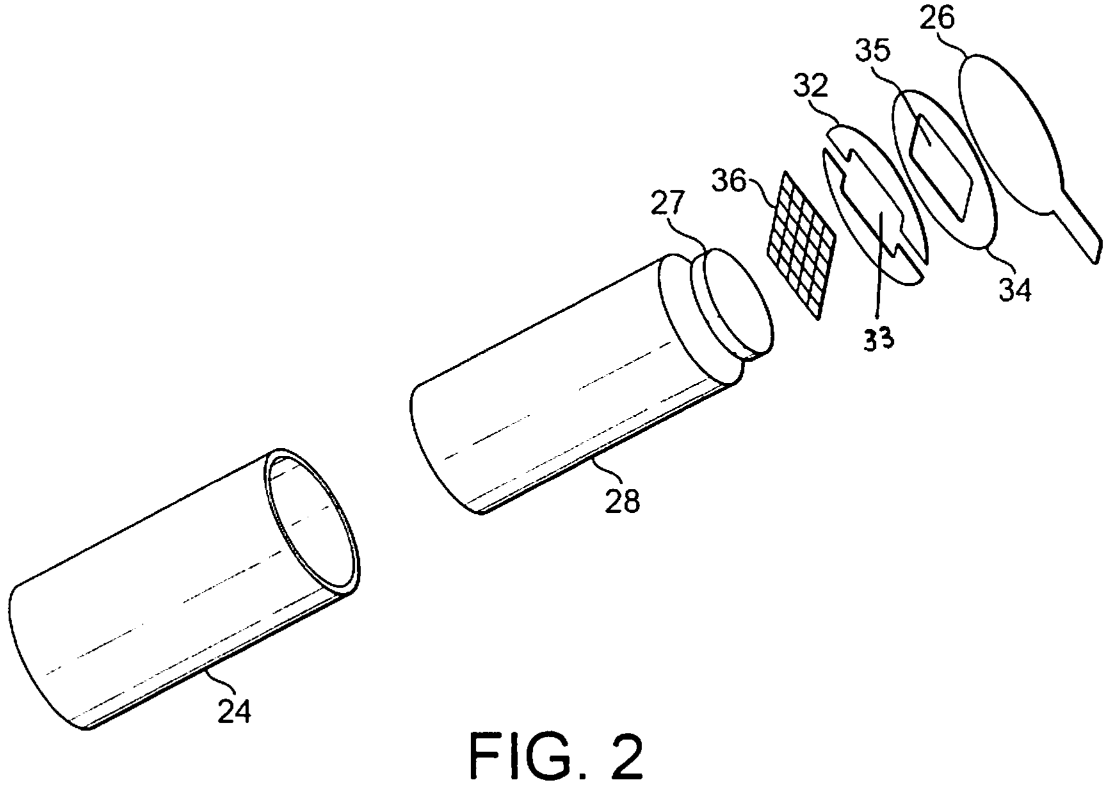
FIG. 2 is an exploded view of a cartridge for use in a system as shown in FIGS. 1*a* to 1*d*.

FIG. 2 is an exploded view of the cartridge 20. The cartridge 20 comprises a generally circular cylindrical housing 24 that has a size and shape selected to be received into the cavity 18. The housing contains capillary material 27, 28 that is soaked in a liquid aerosol-forming substrate. In this example the aerosol-forming substrate comprises 39% by weight glycerine, 39% by weight propylene glycol, 20% by weight water and flavourings, and 2% by weight nicotine. A capillary material is a material that actively conveys liquid from one end to another, and may be made from any suitable material. In this example the capillary material is formed from polyester.

The housing has an open end to which a heater assembly 30 is fixed. The heater assembly 30 comprises a substrate 34 having an aperture 35 formed in it, a pair of electrical contacts 32 fixed to the substrate and separated from each other by a gap 33, and a plurality of electrically conductive heater filaments 36 spanning the aperture and fixed to the electrical contacts on opposite sides of the aperture 35.

The heater assembly 30 is covered by a removable cover 26. The cover comprises a liquid impermeable plastic sheet that is glued to the heater assembly but which can be easily peeled off. A tab is provided on the side of the cover to allow the cover to be grasped when peeling it off. It will now be apparent to one of ordinary skill in the art that although gluing is described as the method to a secure the impermeable plastic sheet to the heater assembly, other methods familiar to those in the art may also be used including heat sealing or ultrasonic welding, so long as the cover may easily be removed by a consumer.

There are two separate capillary materials 27, 28 in the cartridge of FIG. 2. A disc of a first capillary material 27 is provided to contact the heater filament 36 and the electrical contact 32. A larger body of a second capillary material 28 is provided on an opposite side of the first capillary material 27 to the heater assembly. Both the first capillary material and the second capillary material retain liquid aerosol-forming substrate. The first capillary material 27, which contacts the heater element, has a higher thermal decomposition temperature (at least 160° C. or higher such as approximately 250° C.) than the second capillary material 28. The first capillary material 27 effectively acts as a spacer separating the heater filament 36 and the electrical contact 32 from the second capillary material 28, so that the second capillary material 28 is not exposed to temperatures above its thermal decomposition temperature. The thermal gradient across the first capillary material 27 is such that the second capillary material 28 is exposed to temperatures below its thermal decomposition temperature. The second capillary material 28 may be chosen to have superior wicking performance to the first capillary material 27, may retain more liquid per unit volume than the first capillary material 27 and may be less expensive than the first capillary material 27. In this example the first capillary material 27 is a heat resistant material, such as a fiberglass or fiberglass containing material and the second capillary material 28 is a polymer such as suitable capillary material. Exemplary suitable capillary materials include the capillary materials discussed herein and in alternative embodiments may include high density polyethylene (HDPE), or polyethylene terephthalate (PET).

Figure 3:
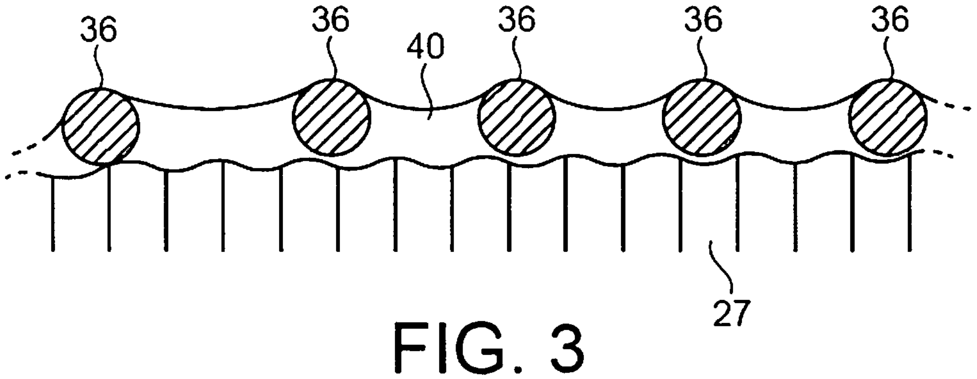
FIG. 3 is a detailed view of the filaments of the heater, showing a meniscus of a liquid aerosol-forming substrate between the filaments.

The capillary material 27, 28 is oriented in the housing 24 to convey liquid to the heater assembly 30. When the cartridge is assembled, the heater filaments 36 may be in contact with the first capillary material 27 and so aerosol-forming substrate can be conveyed directly to the mesh heater. FIG. 3 is a detailed view of the heater filaments 36 of the heater assembly, showing a meniscus 40 of liquid aerosol-forming substrate between the heater filaments 36. It can be seen that aerosol-forming substrate contacts most of the surface of each filament so that most of the heat generated by the heater assembly passes directly into the aerosol-forming substrate.

So, in normal operation, liquid aerosol-forming substrate contacts a large portion of the surface of the heater filaments 36. However, when most of the liquid substrate in the cartridge has been used, less liquid aerosol-forming substrate will be delivered to the heater filaments. With less liquid to vaporize, less energy is taken up by the enthalpy of vaporization and more of the energy supplied to the heating filaments is directed to raising the temperature of the heating filaments. So as the heater element dries out, the rate of increase of temperature of the heater element for a given applied power will increase. The heater element may dry out because the aerosol-forming substrate in the cartridge is almost used up or because very long or very frequent puffs are occurring, and the liquid cannot be delivered to the heater filaments as fast as it is being vaporized.

In use, the heater assembly operates by resistive heating. Current is passed through the heater filaments 36 under the control of control electronics 16, to heat the filaments to within a desired temperature range. The mesh or array of filaments has a significantly higher electrical resistance than the electrical contacts 32 and electrical connectors 19 so that the high temperatures are localised to the filaments. In this example, the system is configured to generate heat by providing electrical current to the heater assembly in response to a puff. In another embodiment the system may be configured to generate heat continuously while the device is in an "on" state. Different materials for the filaments may be suitable for different systems. For example, in a continuously heated system, Ni—Cr filaments are suitable as they have a relatively low specific heat capacity and are compatible with low current heating. In a puff actuated system, in which heat is generated in short bursts using high current pulses, stainless steel filaments, having a high specific heat capacity may be more suitable.

The system includes a puff sensor configured to detect when air is being drawn through the mouthpiece portion 12. The puff sensor (not illustrated) is connected to the control electronics 16, and the control electronics 16 are configured to supply current to the heater assembly 30 only when it is determined that puffing or an application of negative pressure is being applied on the device. Any suitable air flow sensor may be used as a puff sensor, such as a microphone or pressure sensor.

In order to detect this increase in the rate of temperature change, the electric circuitry or control electronics 16 is configured to measure the electrical resistance of the heater filaments. The heater filaments in this example are formed from stainless steel, and so have a positive temperature coefficient of resistance. This means that as the temperature of the heater filaments rises so does their electrical resistance. It will be appreciated that in other embodiments the heater filaments may be formed from a material having a negative coefficient of resistance, for which, as the temperature of the heater filaments rises their electrical resistance decreases.

Figure 4:
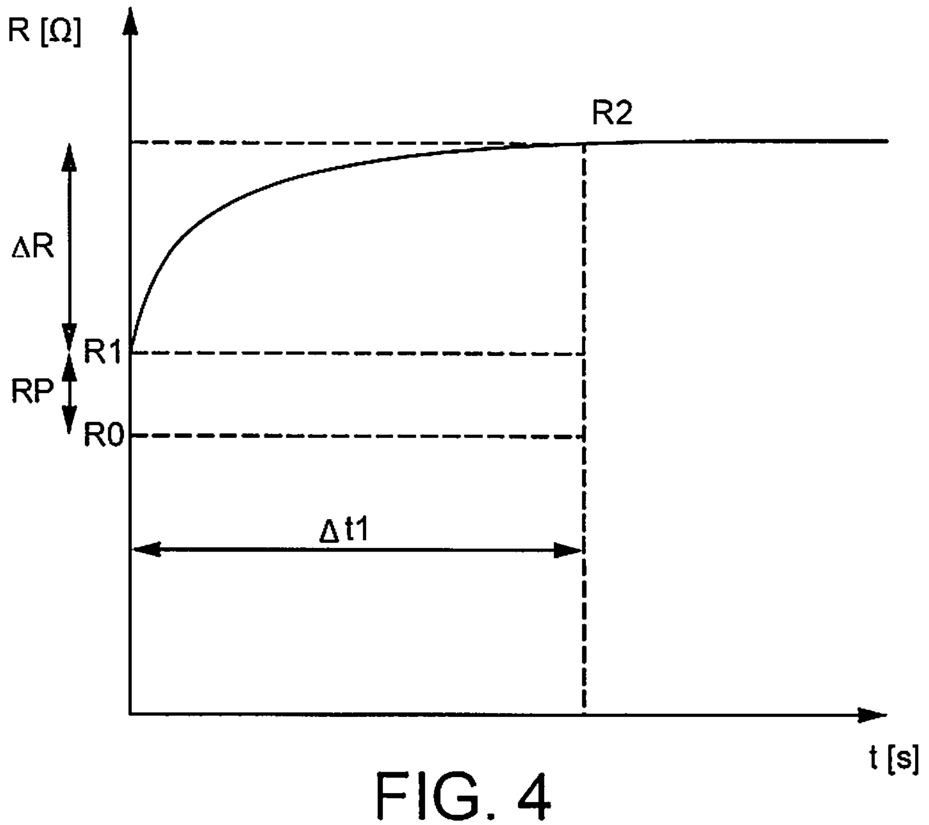
FIG. 4 is a schematic illustration of the change of resistance of the heater during a puff.

FIG. 4 is a schematic illustration of the change of resistance of the heater during a puff or an application of negative pressure. The x-axis is time after initial detection of a puff and the resulting supply of power to the heater. The y-axis is electrical resistance of the heater assembly. It can be seen that the heater assembly has an initial resistance $R_1$ before any heating has occurred. $R_1$ is made up of a parasitic resistance $R_P$ resulting from the electrical contacts 32 and electrical connectors 19 and the contact between them, and the resistance of the heater filaments $R_0$. As power is applied to the heater during a puff, the temperature of the heater filaments rises and so the electrical resistance of the heater filaments rises. As illustrated, at time $t_1$, after a time period of $\Delta t_1$ from the supply of power to the heater from the power supply, the resistance of the heater assembly is $R_2$. The change in electrical resistance of the heater assembly from the initial resistance to the resistance at time $t_1$ is therefore $\Delta R=R_2-R_1$.

In this example the parasitic resistance $R_P$ is assumed to not change as the heater filaments heat up. This is because $R_P$ is attributable to non-heated components, such as the electrical contacts 32 and electrical connectors 19. The value of $R_P$ is assumed to be the same for all cartridges and a value is stored in the memory of the electric circuitry.

To detect a rapid increase in temperature of the heater filaments, indicative of dry conditions at the heater filaments, the change in resistance of the heater filaments can be monitored. The electric circuitry can be configured to determine the change in resistance by determining the difference between measurements of the initial electrical resistance $R_1$ of the heater filaments before power is supplied to the heater elements, in other words before a puff, and measurements the electrical resistance $R_2$ of the heater filaments after a desired or predetermined time period $\Delta t_1$ from when power is supplied to the heater filaments. In addition, the electric circuitry can be configured to determine whether the change in resistance is indicative of an unacceptably rapid increase in temperature by comparing the difference $\Delta R$ to a desired or predetermined maximum threshold value $\Delta R_{max}$.

$R_2$ and $R_1$ are both measured values and $\Delta R_{max}$ is stored in memory. Ideally the value of $R_1$ is measured before any heating takes place, in other words before first activation of the heater. This initial measured value may be used for all subsequent puffs, in order to avoid any error resulting from residual heat from previous puffs. As such, the initial measured electrical resistance before any heating takes place will be referred to as $R_{1ref}$.

$R_{1ref}$ may be measured only once for each cartridge and a detection system used to determine when a new cartridge is inserted, or $R_1$ may be measured each time the system is switched on. However, in an example embodiment, the electric circuitry is configured to periodically take updated measurements of $R_{1ref}$ after desired or predetermined time periods in which no power has been supplied to the heater filaments. The desired or predetermined time period is typically 3 minutes, but may be any suitable time required for the heater filaments to cool from their operating temperature back to room temperature. The periodic updates to $R_{1ref}$ may recalibrate the electric circuitry to compensate for changes in ambient temperature and changes in the condition of the heater filaments.

In this example, software running on a microprocessor in the electric circuitry performs the following comparison to determine an adverse condition:

$$\text{If } R_2>R_{1ref}+\Delta R_{max} \text{ then there are dry conditions at the heater} \quad (1)$$

Other adverse conditions besides dry heater conditions may be detected in a similar way. For example, if a cartridge having a heater formed from a material having a different temperature coefficient of resistance is used in the system, the electric circuitry can detect that and may be configured not to supply power to it. In the present example, the heater filaments are formed from stainless steel. A cartridge having a heater formed from Ni—Cr would have a lower temperature coefficient of resistance, meaning that its resistance would rise more slowly with increasing temperature. As such, a minimum resistance threshold value $\Delta R_{min}$ may be stored in the memory of the electric circuitry which corresponds to the lowest temperature rise in time period $\Delta t_1$ expected for a stainless steel heater element. The electric circuitry may be configured to determine an adverse condition corresponding to an unauthorized cartridge being present in the system if the change in resistance between R2 and R1 ref is less than the minimum threshold value $\Delta R_{min}$.

So the system may be configured to compare the difference between $R_2$ and $R_{1ref}$ with a stored high threshold and a stored low threshold in order to determine adverse conditions. $R_{1ref}$ may also be compared with a threshold or thresholds to check that it is within an expected range. They may even be more than one high stored threshold and different actions taken depending on which high threshold is exceeded. For example, if the highest threshold is exceeded then the circuitry may prevent further supply of power until the heater and/or substrate is replaced. This may be indicative of a completely depleted substrate or a damages or incompatible heater. A lower threshold may be used to determine when the substrate is nearly depleted. If this lower threshold is exceeded, but the higher threshold is not exceeded, then the circuitry may simply provide an indication, such as an illuminated LED, showing that the substrate will soon need to be replaced.

The difference between $R_{1ref}$ and $R_2$ may be continually monitored to determine if the heater is cooling sufficiently between puffs. If the difference does not go below a cooling threshold between puffs because puffing is occurring very frequently, the electric circuitry may prevent or limit the supply of power to the heater until the difference falls below the cooling threshold. Alternatively, a comparison may be made between a maximum value of the difference during a puff and a minimum value for the difference subsequent to the puff, to determine if sufficient cooling is occurring.

Also, the difference between $R_1$ and $R_2$ may be continually monitored and the time at which it reaches a threshold value compared with a time threshold. If the difference between $R_{1ref}$ and $R_2$ reaches the threshold much faster or slower than expected, then it may be indicative of an adverse condition, such as an incompatible heater. The rate of change could also be determined and compared with a threshold. If the difference rises very quickly or very slowly then it may be indicative of an adverse condition. These techniques may allow for incompatible heaters to be detected very quickly.

Figure 5:
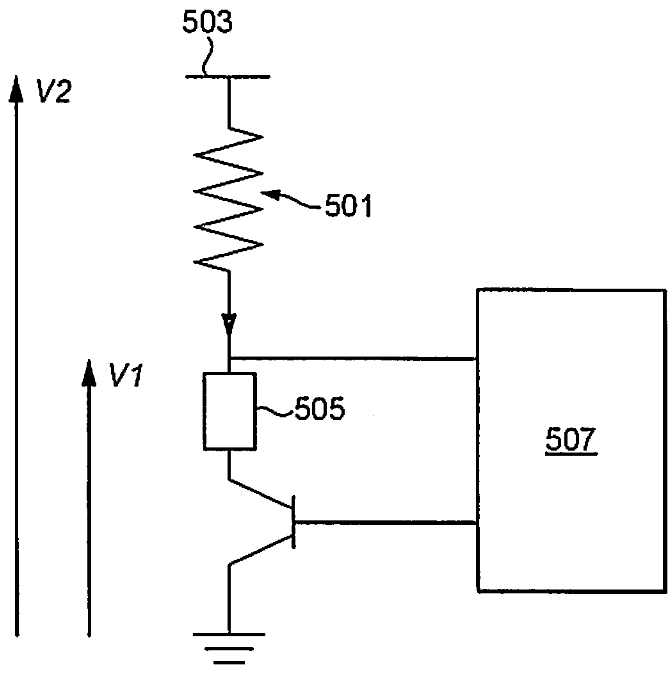
FIG. 5 is an electric circuit diagram showing how the heating element resistance may be measured.

FIG. 5 is a schematic electric circuit diagram showing how the heating element resistance may be measured. In FIG. 5, the heater 501 is connected to a battery 503 which provides a voltage V2. The heater resistance to be measured at a particular time is $R_{heater}$. In series with the heater 501, an additional resistor 505, with known resistance r is inserted connected to voltage V1, intermediate between ground and voltage V2. In order for microprocessor 507 to measure the resistance $R_{heater}$ of the heater 501, the current through the heater 501 and the voltage across the heater 501 can both be determined. Then, the following well-known formula can be used to determine the resistance:

$$V=IR \quad (2)$$

In FIG. 5, the voltage across the heater is V2-V1 and the current through the heater is I. Thus:

$$R_{heater} = \frac{V2 - V1}{I} \quad (3)$$

The additional resistor 505, whose resistance r is known, is used to determine the current I, again using (2) above. The current through the resistor 505 is I and the voltage across the resistor 505 is V1. Thus:

$$I = \frac{V1}{r} \quad (4)$$

So, combining (5) and (6) gives:

$$R_{heater} = \frac{(V2 - V1)}{V1} r \quad (5)$$

Thus, the microprocessor 507 can measure V2 and V1, as the aerosol generating system is being used and, knowing the value of r, can determine the heater's resistance, $R_{heater}$ at different times.

The electric circuitry can control the supply of power to the heater in several different ways following an adverse condition being detected. Alternatively, or in addition, the electric circuitry may simply provide an indication to the use that an adverse condition has been detected. The system may include an LED or display or may comprise a microphone, and these components may be used to issue an alert of an adverse condition.

Figure 6:
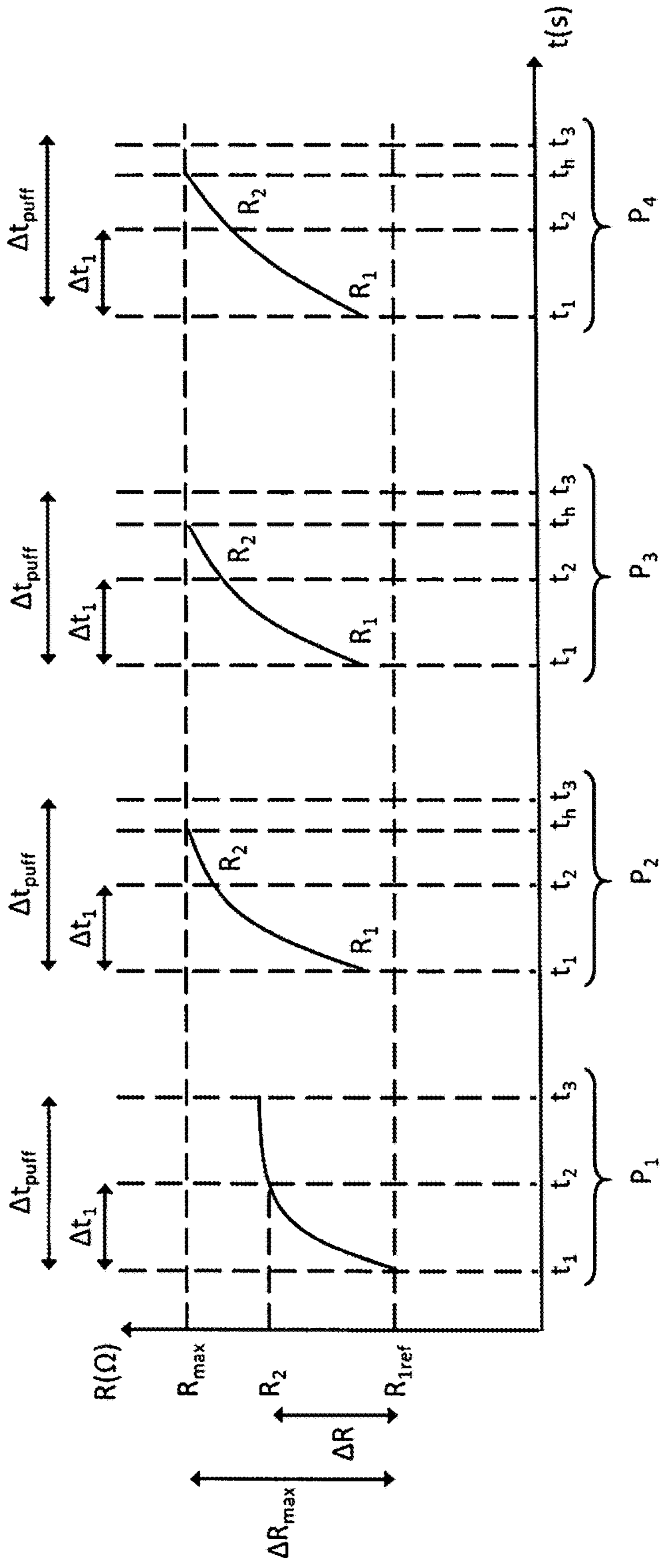
FIG. 6 illustrates a control process following the detection of an adverse condition.

FIG. 6 illustrates a control process for a puff actuated system according to an example embodiment. FIG. 6 shows four consecutive puffs, $P_1$, $P_2$, $P_3$ and $P_4$. The first puff $P_1$ is a normal puff in which there is no abnormal condition. The three subsequent puffs $P_2$, $P_3$ and $P_4$ are all abnormal puffs, which exceed the high threshold $\Delta R_{max}$.

Each puff is detected at a time $t_1$, at which point power is supplied to the heater filaments. The resistance of the heater filaments at time $t_1$ is shown as $R_1$. The initial resistance $R_1$ of the heater filaments for the first puff P1 is equal to the initial reference resistance $R_{1ref}$, which was measured before heating began. Subsequent abnormal puffs $P_2$, $P_3$ and $P_4$ show an initial resistance $R_1$ at time $t_1$ that is above the initial reference resistance $R_{1ref}$. This indicates that the heater filaments have not had sufficient time to cool back to room temperature between puffs. The resistance of the heater filaments is measured at time $t_2$, after a desired or predetermined time period $\Delta t_1$ following the detection of the puff. Each puff ends at time $t_3$, lasting for a total time period of $\Delta t_{puff}$.

In the control process of FIG. 6, the electric circuitry stops the supply of power to the heater as soon as it is determined that the high threshold has been exceeded, until the end of the puff. This is shown at time $t_h$ for the second, third and fourth puffs $P_2$, $P_3$ and $P_4$. This may be useful to prevent the heater becoming too hot even when puffing is occurring excessively. As well as stopping the power, an indication could be provided that the threshold has been reached.

When a new puff is detected, power is supplied to the heater again. This is shown for puffs $P_3$ and $P_4$. A single instance of the high threshold being exceeded could be the result of a very long puff, but several consecutive puffs during which the high threshold is exceeded is more likely to be the result of the cartridge becoming empty. Therefore, in this example, if $\Delta R$ exceeds the high threshold $\Delta R_{max}$ for a particular number of consecutive puffs, typically 3 puffs, the cartridge is disabled by blowing a fuse within the cartridge. It will be appreciated that the cartridge may be disabled in other ways, for example, the electric circuitry may block the supply of further power to the heater filaments until the cartridge is replaced or refilled or a resetting operation is performed.

In various example embodiments, the cartridges are removable from the devices. A cartridge may be removed from a device when the cartridge is empty of liquid aerosol-forming substrate in order to dispose of or refill the cartridge. Also, a cartridge that is partially empty and still contains liquid aerosol-forming substrate may be removed.

A used cartridge may be inserted into the device. For example, a refilled or partially empty cartridge may be inserted into the device. When a recently used cartridge is inserted into a device, the heater may not have had sufficient time to cool down to room temperature after the previous activation. If the electric circuitry of the device measures the initial resistance $R_{1ref}$ of the heater filaments when the heater filaments are still hot, this may skew the determination of adverse conditions by the electric circuitry, and may result in the heater filaments being heated to an undesirable temperature.

Therefore, the electric circuitry may be configured to determine whether the temperature of a heater of a recently inserted cartridge is stable. In other words, the electric circuitry may be configured to determine if the heater of a recently inserted cartridge is at a cool temperature, typically room temperature. This may substantially prevent or inhibit the electric circuitry from measuring the initial resistance $R_{1ref}$ of the heater filaments when the heater filaments are hot.

In various example embodiments, the electric circuitry is configured to determine when a cartridge is received in the device. As such, the electric circuitry is configured to determine when a cartridge is removed from the device and when a cartridge is inserted into the device.

When the electric circuitry determines that a cartridge is inserted into the device, the electric circuitry may be configured to measure a preliminary resistance $R_{p1}$ of the heater filaments. The electric circuitry may also be configured to measure a subsequent preliminary resistance $R_{p2}$ of the heater filaments after a desired or predetermined time period $\Delta T_2$, typically between about 1 s and about 2 s.

The electric circuitry may then be configured to determine the difference $\Delta R$, between the measured preliminary resistances $R_{p1}$, $R_{p2}$. If the temperature of the heater filaments is stable, the magnitude difference $|\Delta R_p|$ should be small or zero. However, if the magnitude of the difference $|\Delta R_p|$ is relatively large, this indicates that the temperature of the heater filaments is not stable. Where the difference $|\Delta R_p|$ is relatively large, this indicates that the heater filaments are hot and are cooling down over the time period $\Delta T_2$. The electric circuitry may be configured to compare the difference $\Delta R_p$ to a minimum threshold value $\Delta R_{pmin}$ and to determine whether the temperature of the heater filaments is stable based on the comparison. The electric circuitry may be configured to determine that the temperature of the heater filaments is not stable if the difference $|\Delta R_p|$ is greater than the minimum threshold value $\Delta R_{pmin}$. The electric circuitry may be configured to perform the following comparison:

If $|R_{p2}-R_{p1}|>\Delta R_{pmin}$ then the temperature of the heater is not stable (6)

where $R_{p2}$ and $R_{p1}$ are both measured values and $\Delta R_{pmin}$ is stored in memory.

It will also be appreciated that in some example embodiments the electric circuitry may be configured to compare the magnitude of the difference $|\Delta R_p|$ to a minimum threshold value $\Delta R_{pmin}$. The electric circuitry may be configured to determine that the temperature of the heater filaments is not stable if the magnitude of the difference $|\Delta R_p|$ is greater than the minimum threshold value $\Delta R_{pmin}$.

If the electric circuitry determines that the temperature of the heater filaments is not stable, the electric circuitry may prevent power from being supplied to the heater filaments and may not measure and store an initial resistance $R_{1ref}$. The electric circuitry may be configured to periodically or continuously measure the subsequent preliminary resistance $R_{p2}$, determine the difference $\Delta R_p$ to the initial preliminary resistance $R_{p1}$ and compare the difference $\Delta R_p$ to the minimum threshold $\Delta R_{min}$ until the difference it is within the expected level for heater filaments at a stable temperature, which is as close to zero as possible.

If the electric circuitry determines that the temperature of the heater filaments is stable, the electric circuitry may be configured to determine the initial reference resistance $R_{1ref}$ and perform the usual processes described above.

It will also be appreciated that in some example embodiments the electric circuitry may be configured to periodically measure a single preliminary resistance $R_{p1}$ after insertion of a new cartridge and determine the difference $\Delta R_p$ between the preliminary resistance $R_{p1}$ and the previous reference resistance $R_{1ref}$ that was measured and stored for the previous cartridge, before the previous cartridge was removed.

Although examples have been described with reference to a cartridge based system, with a mesh heater, the same adverse condition detection methods can be used in other aerosol-generating systems.

Figure 7:
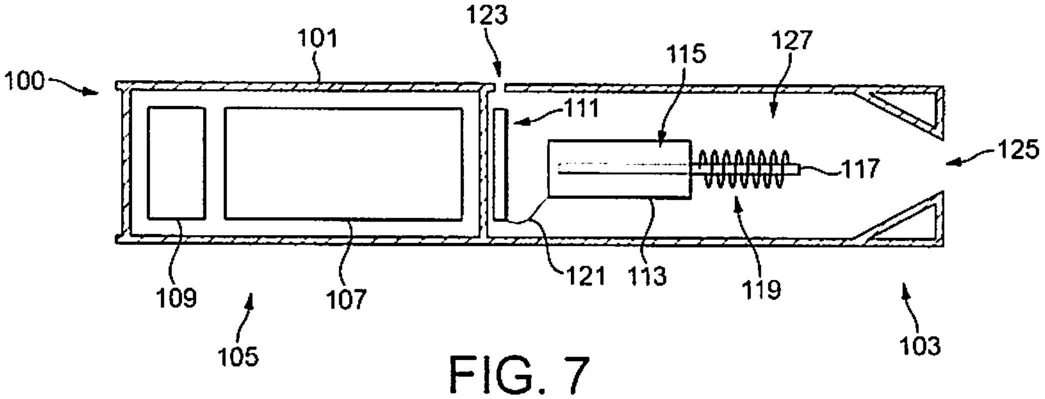
FIG. 7 is a schematic illustration of another aerosol-generating system according to an example embodiment.

FIG. 7 illustrates another aerosol-generating system, which also uses a liquid substrate and a capillary material, in accordance with an example embodiment. The electrically heated aerosol-generating system 100 of FIG. 7 comprises a housing 101 having a mouthpiece end 103 and a body end 105. In the body end, there is provided an electric power supply in the form of battery 107 and electric circuitry 109. A puff detection system 111 is also provided in cooperation with the electric circuitry 109. In the mouthpiece end, there is provided a liquid storage portion in the form of cartridge 113 containing liquid 115, a capillary wick 117 and a heater 119. Note that the heater is only shown schematically in FIG. 7. One end of capillary wick 117 extends into cartridge 113 and the other end of capillary wick 117 is surrounded by the heater 119. The heater is connected to the electric circuitry via connections 121, which may pass along the outside of cartridge 113 (not shown in FIG. 7). The housing 101 also includes an air inlet 123, an air outlet 125 at the mouthpiece end, and an aerosol-forming chamber 127.

In use, operation is as follows. Liquid 115 is conveyed by capillary action from the cartridge 113 from the end of the wick 117 which extends into the cartridge to the other end of the wick which is surrounded by heater 119. When a negative pressure is applied to the aerosol generating system at the air outlet 125, ambient air is drawn through air inlet 123. In the arrangement shown in FIG. 7, the puff detection system 111 senses the puff and activates the heater 119. The battery 107 supplies electrical energy to the heater 119 to heat the end of the wick 117 surrounded by the heater. The liquid in that end of the wick 117 is vaporized by the heater 119 to create a supersaturated vapour. At the same time, the liquid being vaporized is replaced by further liquid moving along the wick 117 by capillary action. The supersaturated vapour created is mixed with and carried in the air flow from the air inlet 123. In the aerosol-forming chamber 127, the vapour condenses to form an aerosol, which is carried towards the outlet 125.

In the example embodiment shown in FIG. 7, the electric circuitry 109 and puff detection system 111 are programmable as in the example embodiment of FIGS. 1*a* to 1*d*.

The capillary wick can be made from a variety of porous or capillary materials that have a known, pre-defined capillarity. Examples include ceramic- or graphite-based materials in the form of fibres or sintered powders. Wicks of different porosities can be used to accommodate different liquid physical properties such as density, viscosity, surface tension and vapour pressure. The wick must be suitable so that the required amount of liquid can be delivered to the heater when the liquid storage portion has sufficient liquid.

The heater comprises at least one heating wire or filament extending around the capillary wick.

As in the system described with reference to FIGS. 1 to 3, the capillary material forming the wick may dry out in the vicinity of the heater wire if the liquid in the cartridge is used up or if very long, deep puffs occur. In the same way as described with reference to the system of FIGS. 1 to 3, the change in resistance of the heater wire during the first portion of each puff can be used to determine if there is an adverse condition, such as a dry wick.

A system of the type illustrated in FIG. 7 may have considerable variation in heater resistance, even between cartridges of the same type, because of variations in the length of heater wire wrapped around the wick. The system does not require the electric circuitry to store a maximum heater resistance value as a threshold; instead it is a resistance increase relative to an initial measured resistance that is used.

Figure 8:
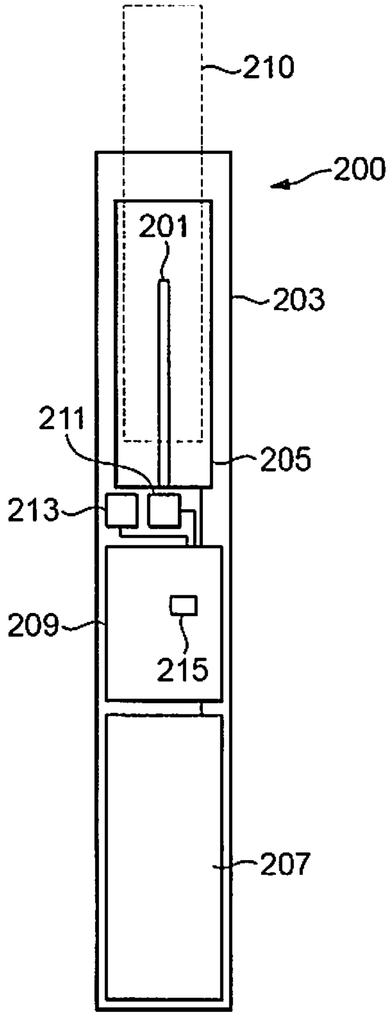
FIG. 8 is a schematic illustration of another aerosol-generating system according to an example embodiment.

FIG. 8 illustrates another aerosol-generating system according to an example embodiment. The example embodiment of FIG. 8 is an electrically heated tobacco device in which a tobacco based solid substrate is heated, but not combusted, to produce an aerosol. In FIG. 8 the components of the aerosol-generating device 200 are shown in a simplified manner and are not drawn to scale. Elements that are not relevant for the understanding of this embodiment have been omitted to simplify FIG. 8.

The electrically heated aerosol-generating device 200 comprises a housing 203 and an aerosol-forming substrate 210, for example a cigarette. The aerosol-forming substrate 210 is pushed inside a cavity 205 formed by the housing 203 to come into thermal proximity with the heater 201. The aerosol-forming substrate 210 releases a range of volatile compounds at different temperatures. By controlling the operation temperature of the electrically heated aerosol-generating device 200 to be below the release temperature of some of the volatile compounds, the release or formation of smoke constituents can be avoided.

Within the housing 203 there is an electrical power supply 207, for example a rechargeable lithium ion battery. Electric circuitry 209 is connected to the heater 201 and the electrical power supply 207. The electric circuitry 209 controls the power supplied to the heater 201 in order to regulate its temperature. An aerosol-forming substrate detector 213 may detect the presence and identity of an aerosol-forming substrate 210 in thermal proximity with the heater 201 and signals the presence of an aerosol-forming substrate 210 to the electric circuitry 209. The provision of a substrate detector is optional. An airflow sensor 211 is provided within the housing and connected to the electric circuitry 209, to detect the airflow rate through the device.

In the described embodiment the heater 201 is an electrically resistive track or tracks deposited on a ceramic substrate. The ceramic substrate is in the form of a blade and is inserted into the aerosol-forming substrate 210 in use. The heater forms part of the device and may be used for heating many different substrates. However, the heater may be a replaceable component, and replacement heaters may have different electrical resistance.

A system of the type described in FIG. 8 may be a continuously heated system in which the temperature of the heater is maintained at a target temperature while the system in on, or it may be a puff actuated system in the temperature of the heater is raised by supplying more power during periods when a puff is detected.

In the case of a puff actuated system, the operation is very similar to that described with reference to the preceding embodiments. If the substrate is dry in the vicinity of the heater, the heater resistance will rise more quickly for a given applied power than if the substrate still contains aerosol-formers that can be vaporized at relatively low temperature.

In the case of a continuously heated system, there will be a temperature drop of the heater initially when a used puffs on the system due to the cooling effect of airflow past the heater. The heater resistance can be measured when a puff is first detected and recorded as R and the subsequent resistance $R_2$ as the system brings the heater back up to the target temperature can be measured after a time period $\Delta t_1$ after puff detection, in a similar manner as described. ΔR can then be calculated as previously described and compared to a stored threshold, as previously described to determine if the substrate is dry in the vicinity of the heater. The substrate may be dry because it has been depleted through use or because it is old or has been improperly stored, or because it is counterfeit and has a different moisture content to a genuine aerosol-forming substrate.

The system of FIG. 8 includes a warning LED 215 in the electric circuitry 209 which is illuminated when an adverse condition is detected.

Figure 9:
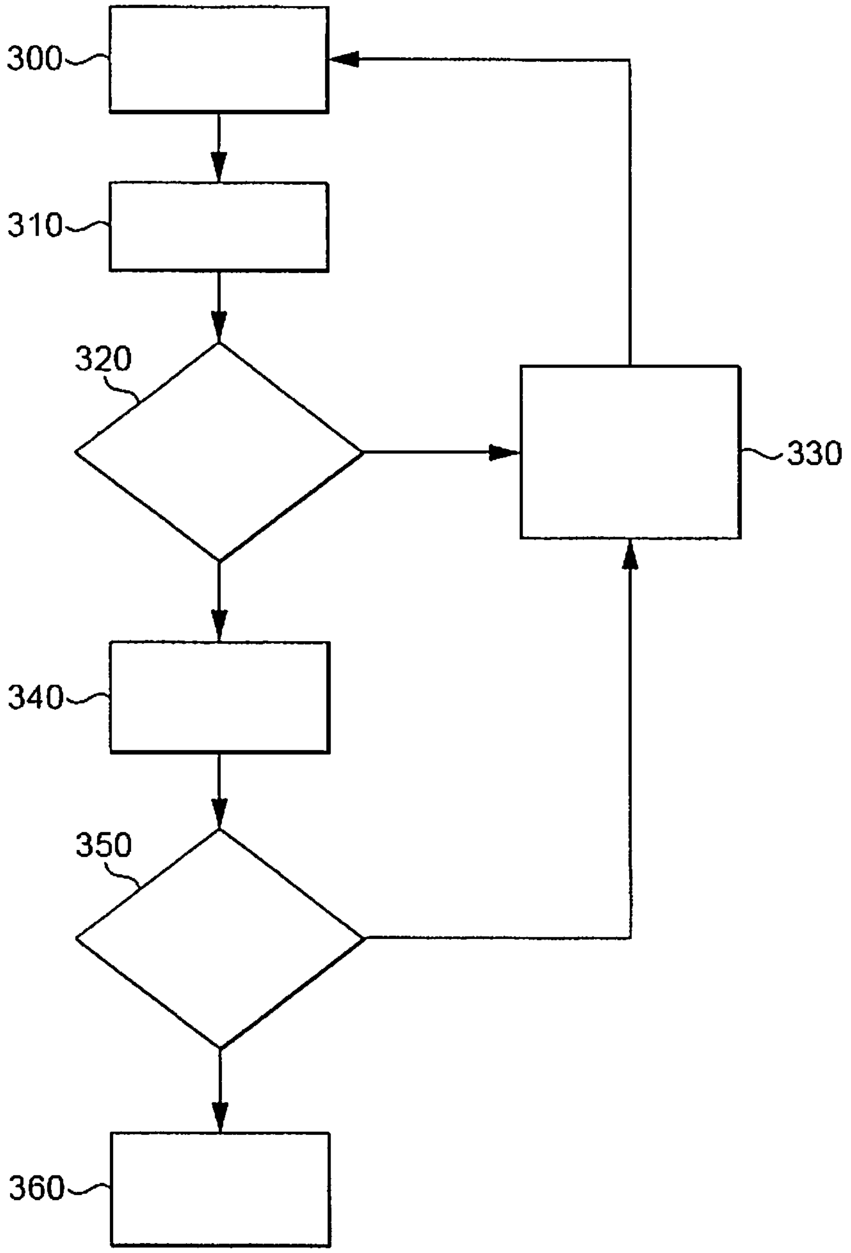
FIG. 9 is flow chart illustrating a method for detecting an unauthorised, damaged, or incompatible heater.

FIG. 9 is flow chart illustrating a method for detecting an unauthorised, damaged, or incompatible heater. In a first step 300, the insertion of a cartridge, including the heater, into the device is detected. Then the electrical resistance of the heater $R_{1ref}$ is measured in step 300. This occurs in a desired or predetermined time period after power is supplied to the heater, such as 100 ms. In step 320 the measured resistance $R_1$ is compared with a range of expected or acceptable resistances. The range of acceptable resistances takes account of manufacturing tolerances and variations between genuine heaters and substrates. If $R_1$ is outside of the expected range then the process proceeds to step 330, in which an indication, such as an audible alarm, is provided and power is prevented from being supplied to the heater as it is considered to be incompatible with the device. The process then returns to step 300, waiting for detection of the insertion of a new cartridge.

As an alternative, or in addition, to measuring an initial resistance $R_{1ref}$ in step 300, an initial rate of change of resistance may be measured within a desired or predetermined time period, say 100 ms, after power is supplied to the heater. This may be done by taking a plurality of resistance measurements at different times during the desired or predetermined time period and then calculating an initial rate of change of resistance from the plurality of resistance measurements and the times at which those measurements were taken. In the same way that a particular design of heater can be expected to have an initial resistance within a range of acceptable values, a particular design of heater can be expected to have an initial rate of change of resistance for a given applied power within an acceptable range of rate of change of resistance values. The calculated initial rate of change of resistance can be compared to an acceptable range of rate of change of resistance values and if the calculated rate of change of resistance is outside of the acceptable range, then the process proceeds to step 330.

If in step 320 it is determined that $R_{1ref}$ is in the range of expected resistance, then the process proceeds to step 340. In step 340, power is applied to the heater for a time period $\Delta t_1$, after which the difference ΔR is calculated. In an example embodiment, $\Delta t_1$ is chosen to be a relatively short time period, before significant generation of aerosol. In step 350 the value of ΔR is compared with a range of expected or acceptable values. The range of expected values again takes account of variations in the manufacture of the heater and substrate assembly. If the value of ΔR is outside of the expected range, the heater is considered incompatible and the process goes to step 330, as previously described, and then returns to step 300. If the value of ΔR is inside the expected range, then the process proceeds to step 360, in which power is supplied to the heater to allow for the generation of aerosol on demand.

Although examples have been described with reference to three different types of electrically heated aerosol-generating systems, it should be clear that the concepts herein may be applicable to other electrically heated aerosol-generating systems.

It should also be clear that the examples may be implemented as a computer program product for execution on programmable controllers within existing aerosol-generating systems. The computer program product may be provided as a downloadable piece of software or on a computer readable medium such as a compact disc.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of operating an aerosol-generating system comprising:

determining an initial resistance of a heater of the aerosol-generating system;

determining whether the heater is an acceptable heater based on the determined initial resistance and stored heater resistance values stored in a memory of the aerosol-generating system; and enabling or disabling operation of the heater based on results of the acceptable heater determination.

2. The method according to claim 1, further comprising:

determining a rate of temperature change of the heater; and determining whether the heater is the acceptable heater based on the determined rate of temperature change and the stored heater resistance values.

3. The method according to claim 1, further comprising:

providing an indication to an adult vaper to replace the heater based on the results of the acceptable heater determination.

4. The method according to claim 1, further comprising: disabling supply of a current from a power supply of the aerosol-generating system to the heater based on the results of the acceptable heater determination.

5. The method according to claim 4, wherein the disabling the supply of the current from the power supply to the heater includes:

blowing at least one fuse connected to the heater.

6. The method according to claim 1, further comprising: determining the initial resistance prior to a puff being detected by a puff detector of the aerosol-generating system.

7. The method according to claim 1, further comprising: detecting an existence of an electrical connection between electric circuitry of the aerosol-generating system and the heater; and measuring the initial resistance of the heater in response to the electrical connection being detected.

8. The method according to claim 1, further comprising: detecting a coupling of a cartridge to a main body of the aerosol-generating system, the cartridge including an aerosol-forming substrate and the heater;

determining the initial resistance in response to the detection of the coupling of the cartridge to the main body; and determining a subsequent resistance of the heater.

9. The method according to claim 8, further comprising: determining a presence of an adverse condition based on a resistance change of the heater compared to a threshold value stored in the memory, the resistance change of the heater based on the determined initial resistance and the determined subsequent resistance; and performing the enabling or disabling of the operation of the heater based on results of the adverse condition determination.

10. The method according to claim 9, further comprising: storing determinations of the adverse condition in the memory;

determining a number of the determinations of the adverse condition that are consecutive; and disabling the heater based on the number of the determinations of the adverse condition that are consecutive.

11. The method according to claim 10, further comprising:

providing an indication to an adult vaper to replace the cartridge based on the results of the acceptable heater determination.

12. The method according to claim 8, further comprising: determining a presence of an adverse condition based on a rate of resistance change of the heater compared to a threshold rate value stored in the memory, the rate of resistance change of the heater based on the determined initial resistance, the determined subsequent resistance, and an elapsed time between the determined initial resistance and the determined subsequent resistance; and performing the enabling or disabling of the operation of the heater based on results of the adverse condition determination.

13. The method according to claim 12, further comprising:

providing an indication to an adult vaper to replace the cartridge based on the results of the acceptable heater determination.

14. The method according to claim 12, further comprising:

storing determinations of the adverse condition in the memory;

determining a number of the determinations of the adverse condition that are consecutive; and disabling the heater based on the number of the determinations of the adverse condition that are consecutive.

15. The method according to claim 8, further comprising: detecting a puff using a puff detector of the aerosol-generating system;

supplying a current from a power supply of the aerosol-generating system to the heater in response to the detected puff; and determining a presence of an adverse condition during the detected puff.

16. The method according to claim 15, further comprising:

measuring the initial resistance of the heater before the current is supplied to the heater in response to the detected puff; and measuring the subsequent resistance of the heater after the current is supplied.

17. A non-transitory computer readable medium having computer readable instructions stored thereon, which when executed by electric circuitry of an aerosol-generating system, causes the electric circuitry to:

determine an initial resistance of a heater of the aerosol-generating system;

determine whether the heater is an acceptable heater based on the determined initial resistance and stored heater resistance values stored in a memory of the aerosol-generating system; and enable or disable operation of the heater based on results of the acceptable heater determination.

18. The non-transitory computer readable medium according to claim 17, wherein the electric circuitry is further caused to:

determine a rate of temperature change of the heater; and determine whether the heater is the acceptable heater based on the determined rate of temperature change and the stored heater resistance values.

19. The non-transitory computer readable medium according to claim 17, wherein the electric circuitry is further caused to:

provide an indication to an adult vaper to replace the heater based on the results of the acceptable heater determination.

20. The non-transitory computer readable medium according to claim 17, wherein the electric circuitry is further caused to:

disable supply of a current from a power supply of the aerosol-generating system to the heater based on the results of the acceptable heater determination.

* * * * *